(12) United States Patent
Shigeta

(10) Patent No.: US 9,164,885 B2
(45) Date of Patent: Oct. 20, 2015

(54) STORAGE CONTROL DEVICE, STORAGE CONTROL METHOD, AND RECORDING MEDIUM

(71) Applicant: FUJITSU LIMITED, Kawasaki-shi, Kanagawa (JP)

(72) Inventor: Soichi Shigeta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 13/800,007

(22) Filed: Mar. 13, 2013

(65) Prior Publication Data

US 2013/0246702 A1    Sep. 19, 2013

(30) Foreign Application Priority Data

Mar. 16, 2012  (JP) ................................. 2012-060005

(51) Int. Cl.
  G06F 13/00    (2006.01)
  G06F 13/28    (2006.01)
  G06F 12/02    (2006.01)
  G06F 3/06     (2006.01)

(52) U.S. Cl.
  CPC .......... *G06F 12/0223* (2013.01); *G06F 3/0605* (2013.01); *G06F 3/0631* (2013.01); *G06F 3/0689* (2013.01)

(58) Field of Classification Search
  CPC . G06F 12/0223; G06F 3/0605; G06F 3/0631; G06F 3/0689
  See application file for complete search history.

(56) References Cited

U.S. PATENT DOCUMENTS

| | | | | |
|---|---|---|---|---|
| 2007/0156957 | A1* | 7/2007 | MacHardy et al. | 711/114 |
| 2009/0100237 | A1* | 4/2009 | Orikasa et al. | 711/162 |
| 2009/0144499 | A1* | 6/2009 | Nicholson et al. | 711/118 |
| 2010/0191906 | A1* | 7/2010 | Beniyama et al. | 711/112 |
| 2010/0312976 | A1  | 12/2010 | Kaneda | |
| 2011/0060887 | A1* | 3/2011 | Thatcher et al. | 711/171 |
| 2011/0252214 | A1* | 10/2011 | Naganuma et al. | 711/170 |
| 2012/0173814 | A1  | 7/2012 | Kawaguchi et al. | |
| 2013/0067187 | A1* | 3/2013 | Moss et al. | 711/170 |

(Continued)

FOREIGN PATENT DOCUMENTS

| | | |
|---|---|---|
| JP | 02-077949 | 3/1990 |
| JP | 2010-086420 | 4/2010 |
| JP | 2010-282608 | 12/2010 |

(Continued)

OTHER PUBLICATIONS

Japanese Office Action mailed Aug. 18, 2015 in corresponding Japanese Patent Application No. 2012-060005.

*Primary Examiner* — Edward Dudek, Jr.
(74) *Attorney, Agent, or Firm* — Staas & Halsey LLP

(57) ABSTRACT

A storage control device includes a memory configured to store a program; and a processor configured to execute a process based on the program. The process includes: writing additional data into an area reserved for allocation in a disk, detecting a volume of the data and the additional data written into the disk as a used amount of the disk, calculating an amount of increase or decrease in a current used amount of the disk with respect to the used amount of the disk previously detected, calculating a changed volume on the basis of a ratio between the amount of increase or decrease in the used amount of the disk and a volume of the area reserved for allocation, and allocating the area reserved for allocation to the disk so that the area reserved for allocation corresponding to the calculated changed volume is continued in the disk.

15 Claims, 20 Drawing Sheets

| VIRTUAL DISK IDENTIFIER | VIRTUAL DISK VOLUME (KB) | ALLOCATED VOLUME (KB) | IDENTIFIER OF VIRTUAL STORAGE OF CREATION SOURCE | USED AMOUNT PREVIOUSLY CHECKED (KB) | CURRENT ACTUALLY-USED AMOUNT | RESERVATION FOR ALLOCATION (NUMBER OF BLOCKS) | PREVIOUS DETERMINATION |
|---|---|---|---|---|---|---|---|
| disk-01 | 309,600,000 | 204,805,120 | vstorage-01 | 204,801,316 | 204,804,535 | 8 | EXPANSION |
| disk-02 | 10,240,000 | 524,288 | vstorage-01 | 516,048 | 523,984 | 10 | KEEP |
| disk-03 | 538,400,000 | 822,272 | vstorage-01 | 822,632 | 822,002 | 1 | KEEP |
| disk-04 | 10,240,000 | 0 | vstorage-02 | 0 | 0 | 1 | - |
| ⋮ | ⋮ | ⋮ | ⋮ | ⋮ | ⋮ | ⋮ | ⋮ |

(56) References Cited

U.S. PATENT DOCUMENTS

2013/0073821 A1* 3/2013 Flynn et al. .................. 711/162
2015/0242329 A1 8/2015 Yamamoto et al.

FOREIGN PATENT DOCUMENTS

| WO | WO 2011/042940 A1 | 4/2011 |
| WO | WO 2011/096014 A1 | 8/2011 |

* cited by examiner

FIG. 4

| PHYSICAL DISK IDENTIFIER | BLOCK NUMBER | STATE | ZERO-CLEARING | VIRTUAL STORAGE OF ALLOCATION DESTINATION | VIRTUAL DISK OF ALLOCATION DESTINATION | |
|---|---|---|---|---|---|---|
| HDD-01 | 0x000001 | NORMALLY FUNCTIONING | FALSE | vstorage-01 | disk-01 | ⎫ 36-1 |
| | ⋮ | ⋮ | ⋮ | ⋮ | ⋮ | |
| | 0x00000F | NORMALLY FUNCTIONING | FALSE | vstorage-01 | disk-01 | ⎭ |
| | 0x000010 | NORMALLY FUNCTIONING | FALSE | vstorage-01 | disk-02 | ⎫ 36-2 |
| | ⋮ | ⋮ | ⋮ | ⋮ | ⋮ | |
| | 0x000017 | NORMALLY FUNCTIONING | FALSE | vstorage-01 | disk-02 | ⎭ |
| | 0x000018 | NORMALLY FUNCTIONING | FALSE | vstorage-01 | disk-01 | ⎫ 36-3 |
| | ⋮ | ⋮ | ⋮ | ⋮ | ⋮ | |
| | 0x00001E | NORMALLY FUNCTIONING | FALSE | vstorage-01 | disk-01 | ⎭ |
| | 0x00001F | NORMALLY FUNCTIONING | TRUE | vstorage-01 | disk-01 | ⎫ 36-4 |
| | ⋮ | ⋮ | ⋮ | ⋮ | ⋮ | |
| | 0x000022 | NORMALLY FUNCTIONING | TRUE | vstorage-01 | disk-01 | ⎭ |
| | 0x000023 | NORMALLY FUNCTIONING | TRUE | vstorage-01 | – | |
| | ⋮ | ⋮ | ⋮ | ⋮ | ⋮ | |
| | 0x131072 | NORMALLY FUNCTIONING | TRUE | vstorage-01 | – | ⎫ 36-5 |
| HDD-02 | 0x000001 | NORMALLY FUNCTIONING | TRUE | vstorage-01 | – | |
| | ⋮ | ⋮ | ⋮ | ⋮ | ⋮ | |
| | 0x131072 | NORMALLY FUNCTIONING | TRUE | vstorage-01 | – | ⎭ |

FIG. 6

| VIRTUAL STORAGE IDENTIFIER | VIRTUAL STORAGE PHYSICAL VOLUME (TB) | VIRTUAL STORAGE PHYSICAL FREE SPACE (TB) | PERCENTAGE OF USED VOLUME (TB) | ALLOCATED PHYSICAL DISK IDENTIFIER |
|---|---|---|---|---|
| vstorage-01 | 20.000 | 10.000 | 50.0 | HDD-01,HDD-02,HDD-03, HDD-04,HDD-05,HDD-06, HDD-07,HDD-08,HDD-09 |
| vstorage-01 | 8.000 | 7.384 | 7.7 | HDD-0A,HDD-0B, HDD-0C,HDD-0D |
| ⋮ | ⋮ | ⋮ | ⋮ | ⋮ |

| VIRTUAL DISK IDENTIFIER | VIRTUAL DISK VOLUME (KB) | ALLOCATED VOLUME (KB) | IDENTIFIER OF VIRTUAL STORAGE OF CREATION SOURCE | USED AMOUNT PREVIOUSLY CHECKED (KB) | CURRENT ACTUALLY-USED AMOUNT | RESERVATION FOR ALLOCATION (NUMBER OF BLOCKS) | PREVIOUS DETERMINATION |
|---|---|---|---|---|---|---|---|
| disk-01 | 309,600,000 | 204,805,120 | vstorage-01 | 204,801,316 | 204,804,535 | 8 | EXPANSION |
| disk-02 | 10,240,000 | 524,288 | vstorage-01 | 516,048 | 523,984 | 10 | KEEP |
| disk-03 | 538,400,000 | 822,272 | vstorage-01 | 822,632 | 822,002 | 1 | KEEP |
| disk-04 | 10,240,000 | 0 | vstorage-02 | 0 | 0 | 1 | — |
| ... | ... | ... | ... | ... | ... | ... | ... |

38

| STATE NAME | THRESHOLD VALUE (PERCENTAGES OF USED VOLUME) | X (DETERMINATION CRITERION FOR "REDUCTION") | Y (DETERMINATION CRITERION FOR "EXPANSION") |
|---|---|---|---|
| A (SPACE TO SPARE) | 30 % | 30 % | 80 % |
| B (STANDARD) | 60 % | 50 % | 100 % |
| C (WARNING) | 80 % | 70 % | 150 % |
| D (TIGHT) | 90 % | ALLOCATION HALT | |

FIG. 9

| APPLICATION STATE NAME | PERCENTAGE OF INCREASED AMOUNT ("GREATER THAN OR EQUAL TO" ~ "LESS THAN") | REDUCTION RATIO |
|---|---|---|
| A (SPACE TO SPARE) | 0~30% | 0.7 |
| B (STANDARD) | 0~50% | 0.5 |
| C (WARNING) | 0~30% | 0.3 |
| | 30~50% | 0.5 |
| | 50~70% | 0.7 |

| APPLICATION STATE NAME | PERCENTAGE OF INCREASED AMOUNT ("GREATER THAN OR EQUAL TO" ~ "LESS THAN") | EXPANSION RATIO |
|---|---|---|
| A (SPACE TO SPARE) | 80~100% | 1.2 |
| | 100~150% | 1.5 |
| | 150%~ | UP TO ACTUAL PERFORMANCE VALUE |
| B (STANDARD) | 100~150% | 1.5 |
| | 150%~ | UP TO ACTUAL PERFORMANCE VALUE |
| C (WARNING) | 150%~ | 1.5 |

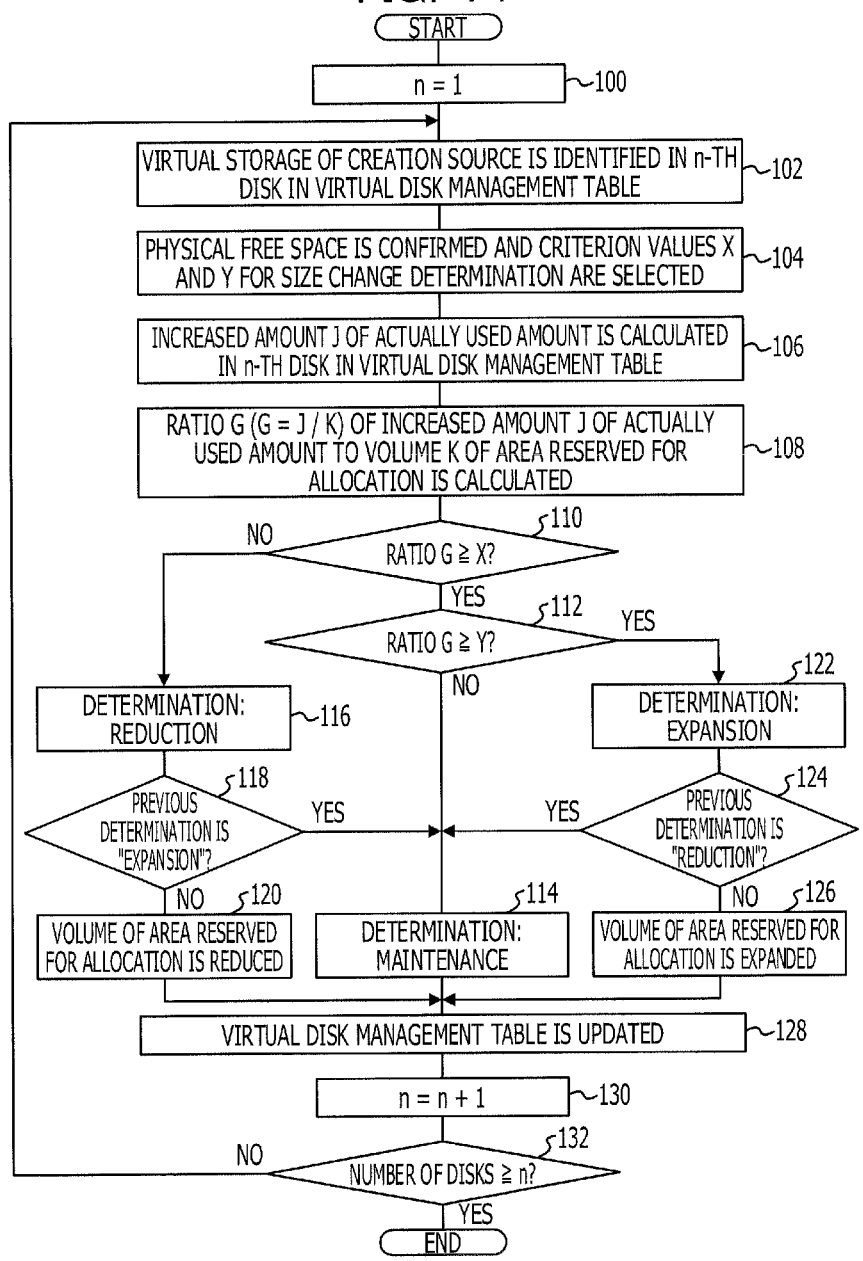

FIG. 18

| VIRTUAL DISK IDENTIFIER | VIRTUAL DISK VOLUME (KB) | ALLOCATED VOLUME (KB) | IDENTIFIER OF VIRTUAL STORAGE OF CREATION SOURCE | USED AMOUNT PREVIOUSLY CHECKED (KB) | CURRENT ACTUALLY-USED AMOUNT | RESERVATION FOR ALLOCATION (NUMBER OF BLOCKS) | PREVIOUS DETERMINATION |
|---|---|---|---|---|---|---|---|
| disk-01 | 309,600,000 | 204,805,120 | vstorage-01 | 204,801,316 | 204,804,535 | 8 ⇒ 8 | EXPANSION ⇒ KEEP |
| disk-02 | 10,240,000 | 524,288 | vstorage-01 | 516,048 | 523,984 | 10 ⇒ 16 | KEEP ⇒ EXPANSION |
| disk-03 | 538,400,000 | 822,272 | vstorage-01 | 822,632 | 822,002 | 1 ⇒ 1 | KEEP ⇒ KEEP |

FIG. 19

| VIRTUAL DISK IDENTIFIER | VIRTUAL DISK VOLUME (KB) | ALLOCATED VOLUME (KB) | IDENTIFIER OF VIRTUAL STORAGE OF CREATION SOURCE | USED AMOUNT PREVIOUSLY CHECKED (KB) | CURRENT ACTUALLY-USED AMOUNT | RESERVATION FOR ALLOCATION (NUMBER OF BLOCKS) | PREVIOUS DETERMINATION |
|---|---|---|---|---|---|---|---|
| disk-01 | 309,600,000 | 204,805,120 | vstorage-01 | 204,804,535 | 204,806,251 | 8 ⇒ 4 | KEEP ⇒ REDUCTION |
| disk-02 | 10,240,000 | 524,288 | vstorage-01 | 523,984 | 523,622 | 16 ⇒ 16 | KEEP ⇒ KEEP |
| disk-03 | 538,400,000 | 822,272 | vstorage-01 | 822,002 | 822,150 | 1 ⇒ 1 | KEEP ⇒ KEEP |

FIG. 20

| VIRTUAL DISK IDENTIFIER | VIRTUAL DISK VOLUME (KB) | ALLOCATED VOLUME (KB) | IDENTIFIER OF VIRTUAL STORAGE OF CREATION SOURCE | USED AMOUNT PREVIOUSLY CHECKED (KB) | CURRENT ACTUALLY-USED AMOUNT | RESERVATION FOR ALLOCATION (NUMBER OF BLOCKS) | PREVIOUS DETERMINATION |
|---|---|---|---|---|---|---|---|
| disk-01 | 309,600,000 | 204,805,120 | vstorage-01 | 204,806,251 | 204,811,371 | 4 ⇒ 4 | REDUCTION ⇒ KEEP |
| disk-02 | 10,240,000 | 524,288 | vstorage-01 | 523,622 | 523,476 | 16 ⇒ 8 | KEEP ⇒ REDUCTION |
| disk-03 | 538,400,000 | 822,272 | vstorage-01 | 822,150 | 822,890 | 1 ⇒ 2 | KEEP ⇒ EXPANSION |

STORAGE CONTROL DEVICE, STORAGE CONTROL METHOD, AND RECORDING MEDIUM

CROSS-REFERENCE TO RELATED APPLICATION(S)

This application is based upon and claims the benefit of priority of the prior Japanese Patent Application No. 2012-060005, filed on Mar. 16, 2012, the entire contents of which are incorporated herein by reference.

FIELD

The embodiment discussed herein is related to a storage control device, a storage control method, and a recording medium.

BACKGROUND

A technique called a thick provisioning method has been known where an entire volume a user has requested so as to store data is allocated to a physical storage including a physical disk space of a finite volume, from the beginning. In the thick provisioning method, since the entire requested volume is allocated independently of a volume to be actually used, the physical storage may not be effectively used.

On the other hand, a technique called a thin provisioning method has been known where, instead of an entire volume a user has requested being allocated from the beginning, a volume to be actually used for storing data is allocated. In the thin provisioning method, a physical disk space included in a storage is divided in units of small areas each of which is called a block (for example, 512 KB), and an available area is arbitrarily allocated with respect to each one block, as desired. In other words, the allocated volume is gradually scaled in a unit of one block in response to the data amount of data to be actually stored. For example, when a virtual disk of 100 GB is created, an area of the number of blocks corresponding to a volume in which the data is actually stored is allocated without an area of 100 GB being physically allocated at the same time as the creation.

Incidentally, in the thin provisioning method, while it may be possible to effectively use a physical storage, areas allocated to individual users are dispersed on the physical disk space. Therefore, in some cases, I/O performance is deteriorated compared with a technique of the thick provisioning method.

Therefore, a technique has been known where a fixed number of blocks are reserved in a physical disk space at the time of the creation of a virtual disk. In this technique, when a virtual disk is created in a physical storage having a physical disk space of a finite volume, a fixed number of blocks are reserved.

In addition, a technique has been known where when the thin provisioning method is applied, an improvement in performance is achieved in a case in which different I/O patterns exist with respect to one logical disk. In this technique, data is written into a storage in which a virtual logical disk is constructed, with a data area being reserved in response to a write request. At this time, in response to an I/O pattern of data of a sequential I/O or a random I/O, a policy assigned to one logical disk is changed, and a fixed block is allocated. Furthermore, a technique has been known where when a file in a filing system managing a program and data is created, the physical continuity of physical blocks configuring the file is secured. In this technique, when a physical block may be successively extended immediately after an area reserved first at the creation of the file, a spare block is expanded.

As techniques of the related art, Japanese Laid-open Patent Publication No. 2010-282608, Japanese Laid-open Patent Publication No. 2010-086420, and Japanese Laid-open Patent Publication No. 2-077949 have been known.

The volume of data to be stored in a storage changes from moment to moment. Accordingly, it is insufficient that, with respect to a physical disk space, an area (block) to be allocated on the physical disk space is considered with fixed timing, for example, only at the time of the creation of a virtual disk or at the time of the creation of a file. In addition, to allocate a fixed area to the physical disk space is insufficient for dealing with the volume of data to be stored in the storage, which changes from moment to moment.

SUMMARY

According to an aspect of the invention, a storage control device includes a memory configured to store a program; and a processor coupled to the memory and configured to execute a process based on the program. The process includes: writing additional data into an area reserved for allocation in a physical disk including a recording area into which data is written, the area reserved for allocation being allocated so as to write thereinto the additional data, detecting a volume of the data and the additional data written into the physical disk as a used amount of the physical disk, calculating an amount of increase or decrease in a current used amount of the physical disk with respect to the used amount of the physical disk previously detected by the detecting, calculating a changed volume, used for changing a volume of the area reserved for allocation, on the basis of a ratio between the amount of increase or decrease in the used amount of the physical disk and a volume of the area reserved for allocation, and allocating the area reserved for allocation to the physical disk so that the area reserved for allocation corresponding to the calculated changed volume is continued in the physical disk.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an image diagram illustrating an example of a physical disk management table;

FIG. 6 is an image diagram illustrating an example of a virtual storage management table;

FIG. 7 is an image diagram illustrating an example of a virtual disk management table;

FIG. 9 is an image diagram illustrating an example of a reduction ratio table;

FIG. 10 is an image diagram illustrating an example of an expansion ratio table;

FIG. 11 is a flowchart illustrating a flow of processing of a calculation process;

FIG. 18 is an image diagram illustrating a specific example when an area reserved for allocation is allocated;

FIG. 19 is an image diagram illustrating a specific example when an area reserved for allocation is allocated; and FIG. 20 is an image diagram illustrating a specific example when an area reserved for allocation is allocated.

DESCRIPTION OF EMBODIMENT

Hereinafter, an example of an embodiment of the disclosed technology will be described in detail with reference to drawings.

Figure 1:
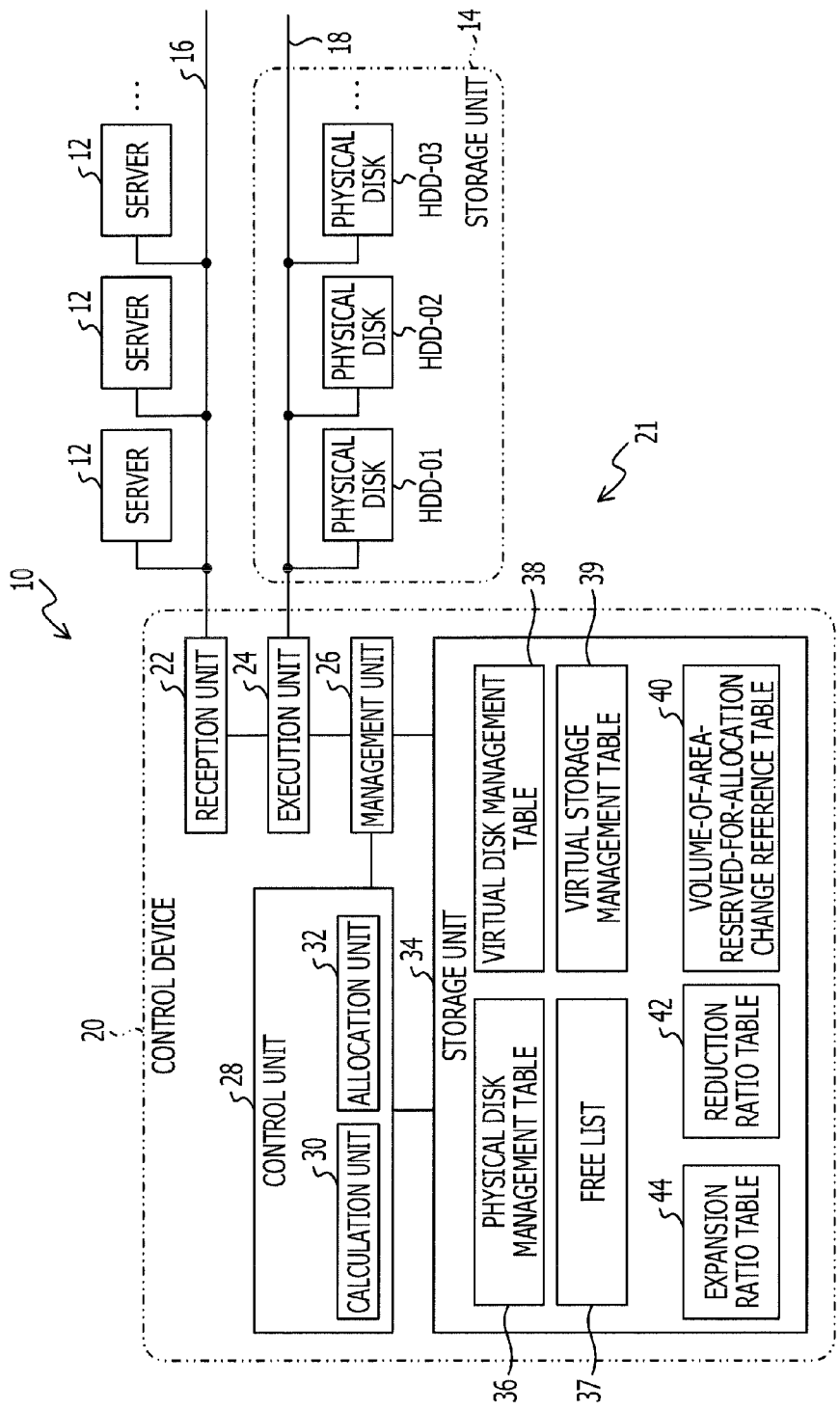
FIG. 1 is a block diagram illustrating a schematic configuration of a computer system according to the present embodiment.

FIG. 1 illustrates the schematic configuration of a computer system 10 according to the present embodiment. In the computer system 10, a plurality of computers 12 (servers in the present embodiment) and a storage device 21 each of the servers 12 uses are individually coupled to a network 16 due to a LAN or the like. The storage device 21 includes a storage unit 14 including a plurality of physical disks HDD-01, HDD-02, . . . , HDD-n (n: a natural number) and a storage control device 20. The storage unit 14 and the storage control device 20 are coupled to each other owing to a connection line 18. In addition, the network 16 may also include a communication network such as Internet.

In addition, while, in FIG. 1, an embodiment where the plural servers 12 are provided is illustrated, the number of the servers 12 is not limited to a plural number, and the number of the servers 12 may also be any number greater than or equal to one.

The storage control device 20 controls the operation of the storage unit 14. While being described in detail later, the storage control device 20 is realized using, for example, a computer. The storage control device 20 includes a reception unit 22, an execution unit 24, a management unit 26, a control unit 28, and a storage unit 34. The control unit 28 includes a calculation unit 30 and an allocation unit 32. In addition, in the storage unit 34, a physical disk management table 36, a free list 37, a virtual disk management table 38, a virtual storage management table 39, a volume-of-area-reserved-for-allocation change reference table 40, a reduction ratio table 42, and an expansion ratio table 44 are stored. The storage unit 34 is a nonvolatile storage device such as, for example, a Hard Disk Drive (HDD) or a flash memory.

In the present embodiment, owing to a technique due to a thin provisioning method, the storage control device 20 effectively uses the physical storage device 21 as a device recording therein the data of the plural servers 12. Specifically, the storage control device 20 allocates a volume actually used for storing data in units of small areas called blocks.

Figure 3:
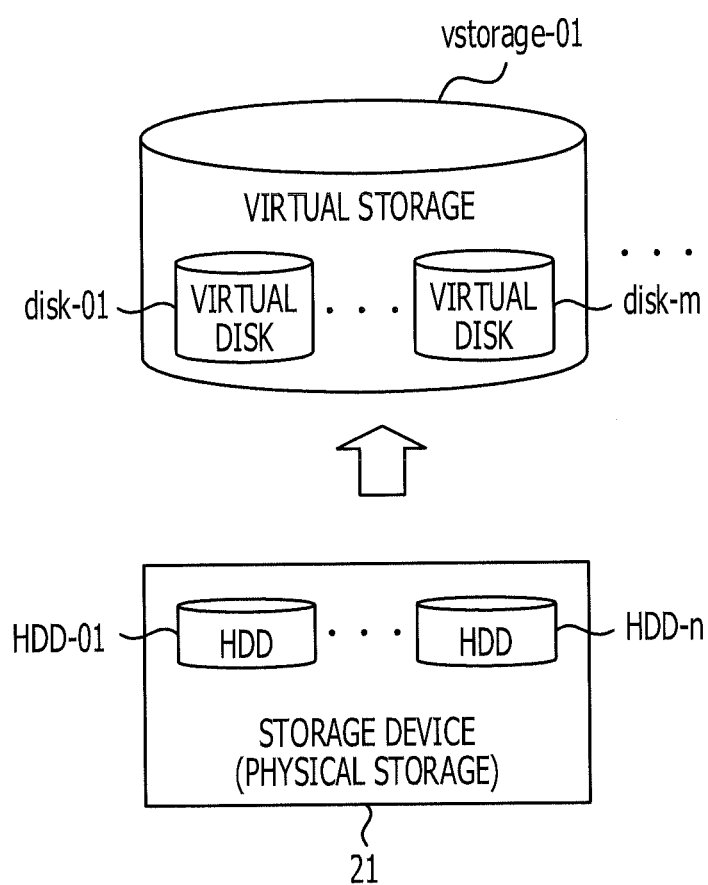
FIG. 3 is an image diagram illustrating examples of a physical conceptual configuration and a virtual conceptual configuration of a storage device according to the present embodiment.

FIG. 3 illustrates the physical conceptual image of the storage device 21 according to the present embodiment and a virtual conceptual image realized owing to a virtualization technique of the related art. The storage device 21 includes the plural physical disks HDD-01 to HDD-n. The virtualization technique integrates a plurality of physical disks and realizes a virtual storage capable of being handled as if it were one mass storage. Furthermore, the virtualization technique realizes a virtual disk on the virtual storage. For example, when two physical disks each of which has the volume of 500 GB are collectively defined as one virtual storage of 1 TB, it may be possible to provide a disk having the volume of 700 GB exceeding the volume of a single physical disk, owing to the virtualization technique. The storage device 21 functions so as to be handled as at least one virtual storage vststorage-01 including virtual disks disk-01 to disk-m (m: a natural number) whose number is greater than or equal to one.

In addition, in the present embodiment, one example will be described when the storage device 21 serving as a physical storage is handled as at least one virtual storage vststorage-01 including the virtual disks disk-01 to disk-m (m: a natural number) whose number is greater than or equal to one. However, the technology disclosed in the present application is not only limited to a case where the storage device 21 is handled as a virtual disk or a virtual storage, and may also be applied to, for example, a case where a storage device handled as a physical storage is mixed and used.

Figure 2:
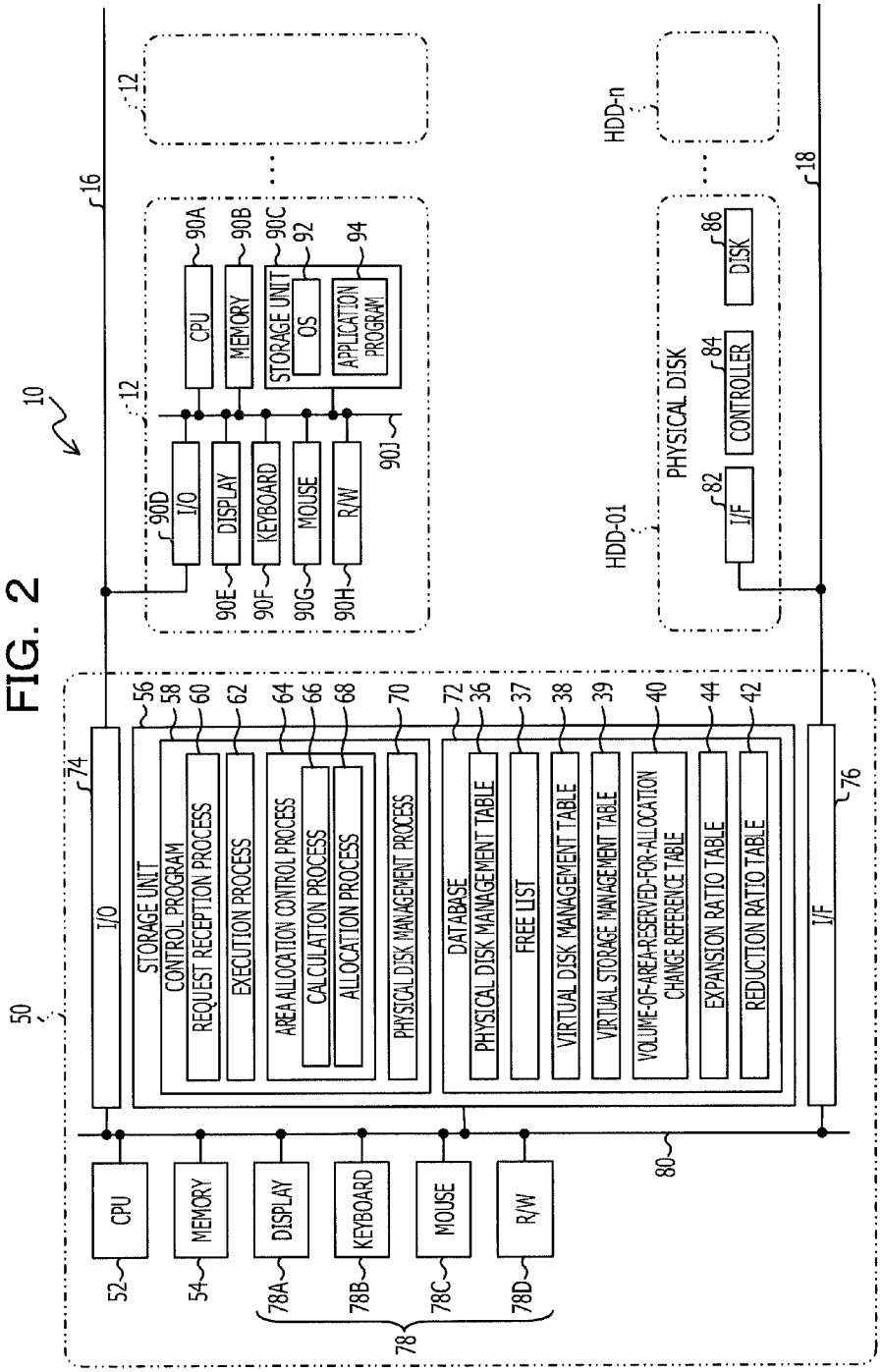
FIG. 2 is a block diagram illustrating an example of a detailed configuration of the computer system according to the present embodiment.

FIG. 2 illustrates an example of the detailed configuration of the computer system 10 including the storage device 21 realized by, for example, a computer.

The server 12 is realized by, for example, a computer illustrated in FIG. 2. In detail, the server 12 includes a CPU 90A, a memory 90B, and a non-volatile storage unit 90C, and these are coupled to one another through a bus 903. The storage unit 90C is realized by a Hard Disk Drive (HDD), a flash memory, or the like. In addition, the server 12 includes an interface (I/O) 90D used for coupling to the network 16, and the I/O 90D is coupled to the bus 903. In addition, the server 12 includes, as an example, input/output devices such as a display 90E, a keyboard 90F, a mouse 90G, and a device (R/W) 90H used for performing read/write on an inserted recording medium, and these are coupled to the bus 903. In addition, these input/output devices may also be omitted, and may also be coupled to the bus 903 as desired. In the storage unit 90C in the server 12, an OS 92 and an application program 94 are stored that are used for causing the server 12 to function. The CPU 90A reads and loads the OS 92 and the application program 94 from the storage unit 90C into the memory 90B to execute processing.

For example, as illustrated in FIG. 2, the physical disk HDD-01 in the storage unit 14 included in the storage device 21 includes an interface (I/F) 82 used for coupling to the connection line 18, a controller 84, and a disk 86 used for storing therein data. For example, as for the physical disk HDD-01, in response to a command or data input to the I/F 82 through the connection line 18, the controller 84 writes data into the disk 86, changes data, or deletes data.

In addition, the storage control device 20 included in the storage device 21 is realized by, for example, a computer 50 illustrated in FIG. 2. In detail, the computer 50 includes a CPU 52, a memory 54, and a non-volatile storage unit 56, and these are coupled to one another through a bus 80. The storage unit 56 is realized using a Hard Disk Drive (HDD), a flash memory, or the like. In addition, the computer 50 includes an interface (I/O) 74 used for coupling to the network 16, and the I/O 74 is coupled to the bus 80 and also coupled to the network 16. In addition, the computer 50 includes an interface (I/O) 76 used for coupling to the connection line 18, and the I/F 76 is coupled to the bus 80 and also coupled to the connection line 18. In addition, the computer 50 includes, as an example, input/output devices 78 such as a display 78A, a keyboard 78B, a mouse 78C, and a device (R/W) 78D used for performing read/write on an inserted recording medium, and these are coupled to the bus 80. In addition, a part of or all of the input/output devices 78 may also be omitted, and may also be coupled to the bus 80 as desired.

In the storage unit 56 in the computer 50, a storage control program 58 is stored that is used for causing the computer 50 to function as the storage control device 20 executing processing for controlling the storage unit 14. The CPU 52 reads and loads the storage control program 58 from the storage unit 56 into the memory 54 to sequentially execute processes included in the storage control program 58. In other words, the storage control device 20 is realized by the computer 50, the CPU 52 executes the storage control program 58, and hence, the computer 50 operates as the storage control device 20.

In addition, the storage control program 58 is an example of a storage control program in the disclosed technology. In addition, the storage control program 58 is also a program used for causing the computer 50 to function as the storage control device 20.

The storage control program 58 includes a request reception process 60, an execution process 62, an area allocation control process 64 including a calculation process 66 and an allocation process 68, and a physical disk management process 70. The CPU 52 executes the request reception process 60, and hence, operates as the reception unit 22 in the storage control device 20 in FIG. 1. In other words, the storage control device 20 is realized by the computer 50 and executes the request reception process 60, and hence, the computer 50 operates as the reception unit 22 in the storage control device 20. In addition, the CPU 52 executes the execution process 62, and hence, operates as the execution unit 24 in the storage control device 20 in FIG. 1. In other words, the storage control device 20 is realized by the computer 50 and executes the execution process 62, and hence, the computer 50 operates as the execution unit 24 in the storage control device 20.

In addition, the CPU 52 executes the area allocation control process 64 and hence, operates as the control unit 28 in the storage control device 20 in FIG. 1. In other words, the storage control device 20 is realized by the computer 50 and executes the area allocation control process 64, and hence, the computer 50 operates as the control unit 28 in the storage control device 20. In addition, the CPU 52 executes the calculation process 66 included in the area allocation control process 64, and hence, the computer 50 operates as the calculation unit 30 in the storage control device 20. In addition, the CPU 52 executes the allocation process 68 included in the area allocation control process 64, and hence, the computer 50 operates as the allocation unit 32 in the storage control device 20.

In addition, the CPU 52 executes the physical disk management process 70, and hence, operates as the management unit 26 in the storage control device 20 in FIG. 1. In other words, the storage control device 20 is realized by the computer 50 and executes the physical disk management process 70, and hence, the computer 50 operates as the management unit 26 in the storage control device 20.

In addition, a database 72 is stored in the storage unit 56 in the computer 50. The database 72 includes the physical disk management table 36, the free list 37, the virtual disk management table 38, the virtual storage management table 39, the volume-of-area-reserved-for-allocation change reference table 40, the reduction ratio table 42, and the expansion ratio table 44. The database 72 stored in the storage unit 56 in the computer 50 corresponds to the storage unit 34 in the storage control device 20 in FIG. 1.

In the physical disk management table 36, information indicating a relationship between the physical disk and the virtual storage and virtual disk in the storage unit 14 in the storage device 21 is stored in the database 72 as a table.

An example of the physical disk management table 36 stored in the database 72 is illustrated in FIG. 4. In the physical disk management table 36, individual pieces of the information of an "identifier of a physical disk", a "block number", a "state", "zero-clearing", a "virtual storage of an allocation destination", and a "virtual disk of an allocation destination" are individually registered with being associated with one another. The information of the "identifier of a physical disk" in the physical disk management table 36 illustrated in FIG. 4 is information indicating an identifier for identifying one of the physical disks HDD-01 to HDD-n included in the storage unit 14. In addition, the information of the "block number" is information indicating the position of each block on the physical disk HDD-01 when the storage area of the physical disk HDD-01 is divided into a plurality of blocks with, for example, a small area of 512 KB being defined as 1 block. In addition, the maximum value of a block number is decided depending on the volume of a physical disk.

In addition, as the information of the "state", data indicating "normally functioning" is stored in an initial state and a normal state. For example, when a block is damaged in such a way as being unreadable, data indicating "malfunctioning" is stored as the information of the "state". In addition, as the information of the "zero-clearing", data indicating "TRUE" is stored in a state where a block is initialized. For example, at the time of data writing, data indicating "FALSE" is stored as the information of the "zero-clearing". For example, the execution unit 24 gives notice to the management unit 26 at the time of writing data into a block, and the management unit 26 having received notice stores data indicating the "FALSE", as the information of the "zero-clearing" of the corresponding block. In addition, as the information of the "virtual storage of an allocation destination", data indicating the virtual storage of the allocation destination of the corresponding block (for example, the identifier of the virtual storage) is stored.

In addition, as the information of the "virtual disk of an allocation destination", data indicating the virtual disk of the allocation destination of the corresponding block (for example, the identifier of the virtual disk) is stored. In addition, the information of the "zero-clearing" and the information of the "virtual disk of an allocation destination" have a relationship. In other words, as for the information of the "zero-clearing" and the information of the "virtual disk of an allocation destination", in the case of a block in an initial state (unused), "TRUE" is stored in the "zero-clearing" and "-" is stored in the "virtual disk of an allocation destination". In addition, in the case of a block allocated to a virtual disk in advance of data writing owing to prediction the detail of which will be described late, "TRUE" is stored in the "zero-clearing" and the "identifier of a virtual disk" is stored in the "virtual disk of an allocation destination". In addition, in the case of a block that is allocated to a virtual disk and into which data has been written, "FALSE" is stored in the "zero-clearing" and the "identifier of a virtual disk" is stored in the "virtual disk of an allocation destination". In addition, in the case of a block where a virtual disk is deleted and which is being initialize, FALSE" is stored in the "zero-clearing" and the "-" indicating unallocation is stored in the "virtual disk of an allocation destination".

In the physical disk management table 36 in FIG. 4, an example where arrangement is performed in response to the usage situation of a physical disk is illustrated. Specifically, a table field 36-1 indicates that, in the physical disk HDD-01, the data of the virtual disk disk-01 is written into an area where block numbers are 0x000001 to 0x00000F. A table field 36-2 indicates that, in the physical disk HDD-01, the data of the virtual disk disk-02 is written into an area where block numbers are 0x000010 to 0x000017. A table field 36-3 indicates that, in the physical disk HDD-01, the data of the virtual disk disk-01 is written into an area where block numbers are 0x000018 to 0x00001E. A table field 36-4 indicates that, in the physical disk HDD-01, an area where block numbers are 0x00001F to 0x000022 is allocated with being predicted to be used by the virtual disk disk-01. A table field 36-5 indicates that an area where the block numbers of the physical disk HDD-01 start in 0x000023 and the physical disk HDD-02 are unused areas (empty spaces).

Figure 5:
FIG. 5 is an image diagram illustrating an example of a free list.

In addition, in the present embodiment, in the management unit 26, so as to easily manage an empty space (a block in an initial state) on a physical disk, the free list 37 is used in addition to the physical disk management table 36. In addition, the free list 37 is not exactly desired in the disclosed technology, and may also be omitted. The free list 37 holds a pair of the beginning block number of an empty space and the ending block number thereof. As illustrated in FIG. 5 as an example, in the free list 37, individual pieces of the information of the "identifier of a virtual storage", the "identifier of a physical disk", the "beginning block number", and the "ending block number" are individually registered with being associated with one another.

The virtual storage management table 39 included in the database 72 in the computer 50 registers therein information where a virtual storage and a physical disk are associated with each other. FIG. 6 illustrates an example of the virtual storage management table 39. In the virtual storage management table 39, individual pieces of the information of the "identifier of a virtual storage", the "physical volume of the virtual storage", the "physical free space of the virtual storage", the "percentage of a used volume", and the "identifier of an allocated physical disk" are individually registered with being associated with one another. In addition, the physical volume of a virtual storage is information indicating the total value of the volumes of physical disks allocated to the virtual storage. In addition, the physical free space of the virtual storage is information indicating the total value of the free spaces of the physical disks allocated to the virtual storage.

In addition, the virtual disk management table 38 included in the database 72 registers therein information indicating the operation situation of the virtual disk. FIG. 7 illustrates an example of the virtual disk management table 38. In the virtual disk management table 38, individual pieces of the information of the "identifier of a virtual disk", the "volume of the virtual disk", and an "allocated volume" are individually registered with being associated with one another. In addition, in the virtual disk management table 38, individual pieces of the information of the "identifier of the virtual storage of a creation source", a "used amount previously checked", a "current actually-used amount", a "volume reserved for allocation", and "previous determination" are individually registered with being associated with one another.

The information of the "identifier of a virtual disk" in the virtual disk management table 38 illustrated in FIG. 7 is information used for identifying the virtual disk. In addition, the information of the "volume of a virtual disk" is information indicating a volume preliminarily set for the virtual disk. In addition, the information of the "allocated volume" is information indicating a volume actually allocated to the virtual disk so as to write data. In addition, the information of the "identifier of the virtual storage of a creation source" is information used for identifying the virtual storage of a creation source when the virtual disk has been created. In addition, the information of the "used amount previously checked" is information indicating the actually used amount of a previous detection result when the used amount of the virtual disk is periodically detected owing to area allocation control processing the detail of which is described later. In addition, the information of the "current actually-used amount" is information indicating the actually used amount of a current detection result due to the area allocation control processing the detail of which is described later. In addition, the information of the "volume reserved for allocation" is information indicating the volume of an area reserved for allocation, calculated when the used amount of the virtual disk is periodically detected owing to the area allocation control processing the detail of which is described later. In addition, the information of the "previous determination" is information indicating a determination result of whether an area reserved for allocation is to be decreased, increased, or kept with respect to the used amount of the virtual disk due to the area allocation control processing the detail of which is described later.

Figure 8:
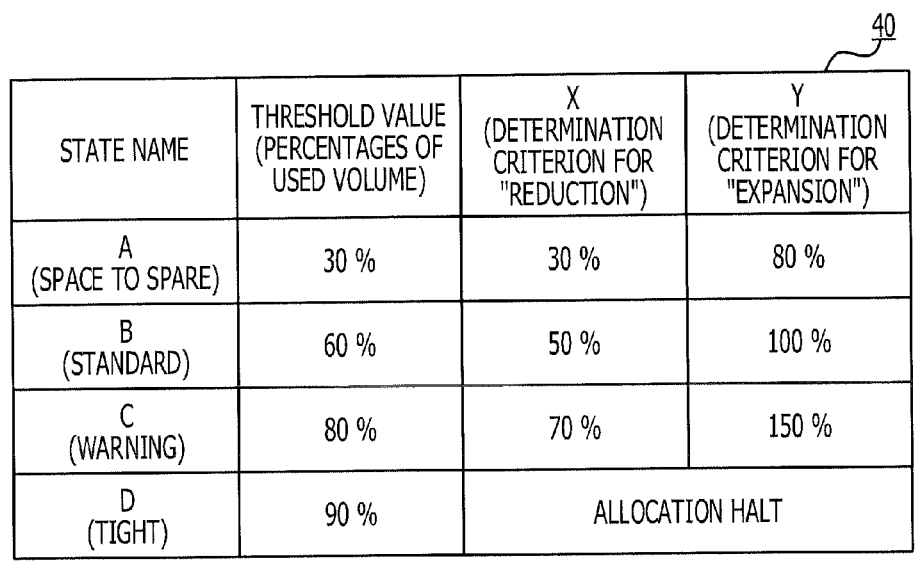
FIG. 8 is an image diagram illustrating an example of a volume-of-area-reserved-for-allocation change reference table.

In addition, the volume-of-area-reserved-for-allocation change reference table 40 included in the database 72 registers therein information indicating a determination criterion when the volume of an area reserved for allocation is scaled. Specifically, when the used amount of the virtual disk is periodically detected owing to the area allocation control processing the detail of which is described later, the volume-of-area-reserved-for-allocation change reference table 40 indicates a criterion for determining whether the volume of an area where successive blocks are reserved for allocation in a physical disk is to be expanded or reduced or allocation is to be halted. FIG. 8 illustrates an example of the volume-of-area-reserved-for-allocation change reference table 40. In the volume-of-area-reserved-for-allocation change reference table 40, individual pieces of the information of a "state name", a "threshold value", "X", and "Y" are individually registered.

The information of the "state name" in the volume-of-area-reserved-for-allocation change reference table 40 illustrated in FIG. 8 is information indicating the state of the physical free space of a virtual storage. In other words, the "state name" corresponds to a state relating to the total amount of the free space of a physical disk belonging to the virtual storage. In the present embodiment, four states such as a state A, a state B, a state C, and a state D are used. The state A indicates a state where there is enough space in the physical free space of the virtual storage. The state B indicates that the physical free space of the virtual storage in a standard state preliminarily defined. The state C indicates a state where the physical free space of the virtual storage is small. The state D indicates a state where the physical free space of the virtual storage is limited. In addition, while, in the present embodiment, a case will be described where the four states such as the state A, the state B, the state C, and the state D are used, the disclosed technology is not limited to the four states. For example, two states or three states may also be adopted, and five or more states may also be adopted.

The information of the "threshold value" in the volume-of-area-reserved-for-allocation change reference table 40 indicates threshold values for the percentages of used volumes individually corresponding to the state A, the state B, the state C, and the state D serving as the above-mentioned information of the "state name". This percentage of a used volume indicates the percentage of the physical free space of the virtual storage in the physical volume of the virtual storage. FIG. 8 indicates an example where data of 30%, data of 60%, data of 80%, and data of 90% are stored in the state A, the state B, the state C, and the state D as the threshold values, respectively. For example, a case where the percentage of the used volume of the virtual storage is less than or equal to 30% corresponds to the state A with space to spare, a case where the percentage of the used volume of the virtual storage exceeds 30% and is less than 60% corresponds to the standard state B, a case where the percentage of the used volume of the virtual storage exceeds 60% and is less than 80% corresponds to the state C where it is desirable to issue warning, and a case where the percentage of the used volume of the virtual storage exceeds 80% and is less than 90% corresponds to the tight state D. In this case, when the percentage of the used volume of the virtual storage is greater than or equal to 90%, it may be possible to transfer to another processing operation, as an emergency state. In addition, the tight state D may be defined as a state of exceeding 80%. In other words, the tight state D may be defined as a state of exceeding 80% and ranging to 100%.

In addition, the pieces of the information of the "X" and "Y" in the volume-of-area-reserved-for-allocation change reference table 40 are pieces of information indicating the determination criterion values of scaling. The determination criterion value of scaling indicates a determination criterion value for the percentage of the amount of increase or decrease in data written into an actual physical disk with respect to the volume of an area reserved for allocation, preliminarily allocated. FIG. 8 illustrates an example where data of 30%, data of 50%, and data of 70% are stored in the state A, the state B, and the state C as the determination criterion values X for reduction, respectively. In addition, as for the determination criterion value X for reduction in the case of the state D, since the physical free space of the virtual storage is estimated to be limited, information is stored that indicates that setting an area reserved for allocation in the physical disk is halted. In addition, an example is also illustrated where data of 80%, data of 100%, and data of 150% are stored in the state A, the state B, and the state C as the determination criterion values Y for expansion, respectively. In addition, in the same way as the determination criterion value for reduction, as for the determination criterion value Y for expansion at the time of the state D, information is stored that indicates that setting an area reserved for allocation in the physical disk is halted.

The determination criterion value X for reduction operates simultaneously with the reduction ratio table 42 illustrated in FIG. 9. FIG. 9 illustrates an example of the reduction ratio table 42. In the reduction ratio table 42, individual pieces of the information of an "application state name", the "percentage of an increased amount", and a "reduction ratio" are individually registered with being associated with one another. The percentage of an increased amount in the reduction ratio table 42 serves as a criterion value for the determination criterion value X for reduction in the volume-of-area-reserved-for-allocation change reference table 40, and a reduction ratio is set. For example, in the state A with space to spare, when the percentage of an increased amount is 0% to 30%, the reduction ratio for the volume of an area reserved for allocation is set to "0.7". In addition, in the standard state B, when the percentage of an increased amount is 0% to 50%, the reduction ratio for the volume of an area reserved for allocation is set to "0.5". In addition, in the present embodiment, as for the state C where it is desirable to issue warning, a stepwise reduction ratio is settable. For example, the percentage of an increased amount is classified into three stages and settable with respect to 0% to 70%. In other words, in the state C, when the percentage of an increased amount is 0% to 30%, the reduction ratio for the volume of an area reserved for allocation is set to "0.3", when the percentage of an increased amount is 30% to 50%, the reduction ratio is set to "0.5", and when the percentage of an increased amount is 50% to 70%, the reduction ratio is set to "0.7". In addition, in the case of a boundary value (30% or 50%), it may be desirable to preliminarily set a definition for using one of the two reduction ratios.

In addition, the determination criterion value Y for expansion operates simultaneously with the expansion ratio table 44 illustrated in FIG. 10. FIG. 10 illustrates an example of the expansion ratio table 44. In the expansion ratio table 44, individual pieces of the information of an "application state name", the "percentage of an increased amount", and an "expansion ratio" are individually registered with being associated with one another. The percentage of an increased amount in the expansion ratio table 44 serves as a criterion value for the determination criterion value Y for expansion in the volume-of-area-reserved-for-allocation change reference table 40, and an expansion ratio is set. In addition, in the present embodiment, as for the state A with space to spare, a stepwise expansion ratio is settable. For example, the percentage of an increased amount is classified into three stages and settable with respect to 80% or more. In other words, in the state A, when the percentage of an increased amount is 80% to 100%, the expansion ratio for the volume of an area reserved for allocation is set to "1.2", when the percentage of an increased amount is 100% to 150%, the expansion ratio is set to "1.5", and when the percentage of an increased amount is 150% or more, the expansion ratio is set to an "actual performance value". In addition, as for the actual performance value, a value obtained by dividing the actual performance value of an increased amount by the volume of an area reserved for allocation is used as the expansion ratio. In addition, in the case of a boundary value (100% or 150%), it may be desirable to preliminarily set a definition for using one of the two expansion ratios. In addition, in the present embodiment, as for the standard state B, a stepwise expansion ratio is settable. For example, the percentage of an increased amount is classified into two stages and settable with respect to 100% or more. In other words, in the state B, when the percentage of an increased amount is 100% to 150%, the expansion ratio for the volume of an area reserved for allocation is set to "1.5", and when the percentage of an increased amount is 150% or more, the expansion ratio is set to an "actual performance value". In addition, in the state C, when the percentage of an increased amount is 150% or more, the expansion ratio for the volume of an area reserved for allocation is set to "1.5".

Next, the function of the present embodiment will be described.

In the present embodiment, for storage performance, for example, so as to reduce the deterioration of I/O performance, the actual volume of data to be stored in the storage device 21, which changes from moment to moment, is detected, and successive blocks are preliminarily allocated to a physical disk, as an area reserved for allocation. Therefore, on the basis of set detection timing (for example, every given period of time), update processing for the volume of an area reserved for allocation is executed where the actual volume of data to be stored in the storage device 21, which changes from moment to moment, is detected and the volume of an area reserved for allocation is obtained.

In other words, in the present embodiment, processing due to the calculation process 66 included in the area allocation control process 64 in the storage control program 58 is periodically executed in the computer 50. For example, the CPU 52 in the computer 50 reads and loads the calculation process 66, included in the area allocation control process 64, from the storage unit 56 into the memory 54 and executes the calculation process 66. Therefore, the CPU 52 executes the update processing for the volume of an area reserved for allocation. In addition, the update processing for the volume of an area reserved for allocation may also be executed in response to, for example, an instruction due to a user in the input/output device 78 such as the keyboard 78B.

FIG. 11 is a flowchart illustrating the flow of the calculation process 66 included in the storage control program 58, executed in the computer 50 according to the present embodiment. The calculation process 66 is executed in the computer 50, and hence, the computer 50 operates as the calculation unit 30 in the control unit 28 in the storage control device 20, and executes the update processing for the volume of an area reserved for allocation. Every given period of time (for example, every five minutes), the update processing for the volume of an area reserved for allocation is executed. As illustrated in FIG. 11, first, a variable n is set to an initial value (n=1) (step 100). Next, in the n-th virtual disk disk-n in the virtual disk management table 38, the virtual storage of the creation source of the virtual disk is identified (step 102). So as to identify the virtual storage, it is desirable that the calculation unit 30 refers to the virtual disk management table 38 and extracts the virtual storage of a creation source registered in the virtual disk management table 38, with respect to each virtual disk.

The physical free space of the virtual storage identified in the step 102 is confirmed, and the determination criterion values X and Y are selected (step 104). First, the calculation unit 30 refers to the virtual storage management table 39, and confirms the physical free space of the virtual storage identified in the step 102. In addition, while being described in detail later, the virtual storage management table 39 has been updated by the allocation unit 32 in the control unit 28 in the storage control device 20. Next, the calculation unit 30 acquires the percentage of a used volume with respect to the corresponding virtual storage in the virtual storage management table 39. In addition, the calculation unit 30 refers to the volume-of-area-reserved-for-allocation change reference table 40, and acquires the determination criterion value X for reduction and the determination criterion value Y for expansion with respect to the acquired percentage of the used volume of the virtual storage.

Next, with respect to the n-th virtual disk disk-n in the virtual disk management table 38, the calculation unit 30 calculates the increased amount of an actually used amount (step 106). In other words, with respect to the n-th virtual disk disk-n at the current moment, the calculation unit 30 subtracts a used amount previously checked (five minutes before in the present embodiment) from the current actually-used amount, and hence, calculates the increased amount J of the actually used amount. In addition, the calculation unit 30 calculates the ratio G (G=J/K) of the increased amount J of the actually used amount to the current volume K of an area reserved for allocation (step 108). The current volume K of an area reserved for allocation is obtained from the number of blocks reserved for allocation in the virtual disk management table 38. In other words, in the present embodiment, since, for example, 1 block corresponds to 512 KB, the current volume K of an area reserved for allocation is obtained by multiplying the number of blocks by 512 KB.

Next, the calculation unit 30 determines whether or not the ratio G is greater than or equal to the determination criterion value X for reduction (step 110). When affirmative determination has been performed in the step 110, the calculation unit 30 determines whether or not the ratio G is greater than or equal to the determination criterion value Y for expansion (step 112). When negative determination has been performed in the step 112, the calculation unit 30 decides determination as "keep" (step 114).

On the other hand, when negative determination has been performed in the step 110, the calculation unit 30 decides determination as "reduction" (step 116). In addition, the calculation unit 30 refers to the virtual disk management table 38, and determines whether or not the previous determination has been "expansion" (step 118). When affirmative determination has been performed in the step 118, the computer 50 decides determination as the "keep" (step 114). On the other hand, when negative determination has been performed in the step 118, the calculation unit 30 reduces the volume of an area reserved for allocation (step 120). In the step 120, the calculation unit 30 refers to the reduction ratio table 42, and acquires a reduction ratio corresponding to the percentage of an increased amount in a state coinciding with a matching state. In addition, the calculation unit 30 multiplies the volume of an area reserved for allocation (the number of blocks) by the acquired reduction ratio, and obtains the volume of an area reserved for allocation (the number of blocks) to be allocated from now. Using the volume of an area reserved for allocation (the number of blocks) to be allocated from now, obtained in this way, the calculation unit 30 updates the number of blocks reserved for allocation in the virtual disk management table 38 (step 128).

In addition, when affirmative determination has been performed in the step 112, the calculation unit 30 decides determination as the "expansion" (step 122). The calculation unit 30 refers to the virtual disk management table 38, and determines whether or not the previous determination has been the "reduction" (step 124). When affirmative determination has been performed in the step 124, the calculation unit 30 decides determination as the "keep" (step 114). On the other hand, when negative determination has been performed in the step 124, the calculation unit 30 expands the volume of an area reserved for allocation (step 126). In the step 126, the calculation unit 30 refers to the expansion ratio table 44, and acquires an expansion ratio corresponding to the percentage of an increased amount in a state coinciding with a matching state. In addition, the calculation unit 30 multiplies the volume of an area reserved for allocation (the number of blocks) by the acquired expansion ratio, and obtains the volume of an area reserved for allocation (the number of blocks) to be allocated from now. Using the volume of an area reserved for allocation (the number of blocks) to be allocated from now, obtained in this way, the calculation unit 30 updates the number of blocks reserved for allocation in the virtual disk management table 38 (step 128).

In addition, when the determination is decided as the "keep" in the step 114, the number of blocks reserved for allocation in the virtual disk management table 38 may not be updated owing to the calculation unit 30.

Next, the calculation unit 30 updates the virtual disk management table 38 (step 128). In other words, the calculation unit 30 updates the determination value decided owing to the step 114, the step 116, or the step 122, as the information of the previous determination of the virtual disk management table 38. In addition, in the step 128, the calculation unit 30 updates the used amount previously checked to the current actually-used amount registered in the virtual disk management table 38, and updates the information of the current actually-used amount to a used amount at the current moment.

Next, the calculation unit 30 increments the variable n (step 130), and determines whether or not the variable n is greater than or equal to the total number of virtual disks in the virtual disk management table 38 (step 132). When negative determination has been performed in the step 132, the processing returns to the step 102, and, in the same way as described above, processing is executed with respect to remaining virtual disks. On the other hand, when affirmative determination has been performed in the step 132, the calculation unit 30 terminates the present processing routine. In addition, though FIG. 11 does not illustrate, when one virtual disk straddles a plurality of virtual storages and a plurality of virtual storages are registered in the virtual disk management table 38, a subsequent virtual storage is identified, the processing returns to the step 104, and the processing is repeated.

Here, in the present embodiment, owing to the processing operations in the steps 100 to 126, when the free space of the virtual storage is large, the allocation of an area reserved for allocation is actively implemented, and when the free space thereof is small, the allocation of an area reserved for allocation is suppressed. In other words, using the volume-of-area-reserved-for-allocation change reference table 40 in FIG. 8, the determination criterion for reduction, keep, or expansion is changed in response to the physical free space of the virtual storage. In addition, using the reduction ratio table 42 in FIG. 9 and the expansion ratio table 44 in FIG. 10, the reduction ratio or the expansion ratio is changed. In this way, the determination criterion is changed in response to the free space. Accordingly, in response to the free space of the virtual storage, a volume to be allocated as an area reserved for allocation is adjusted.

Figure 12A:
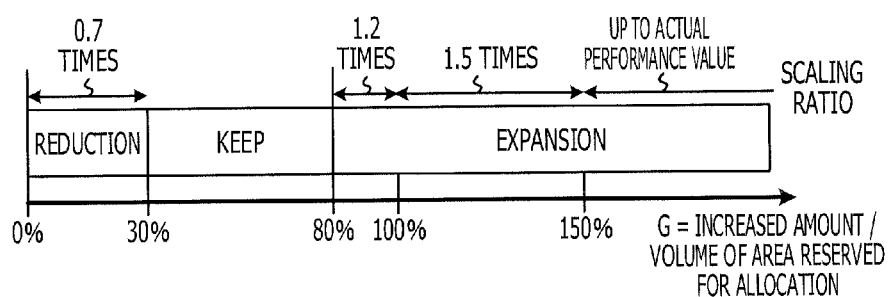
FIGS. 12A, 12B and 12C are image diagrams schematically illustrating settings of an expansion ratio and a reduction ratio corresponding to a free space of a virtual storage.
Figure 12B:
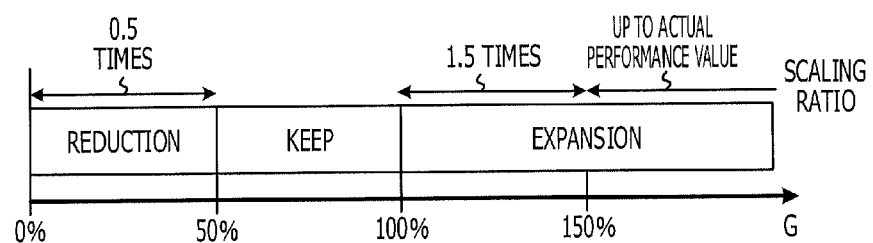
Figure 12C:
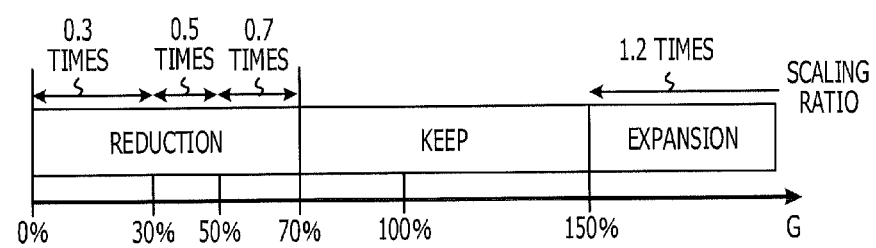

FIGS. 12A, 12B and 12C schematically illustrate settings of the expansion ratio and the reduction ratio corresponding to the free space of the virtual storage. As illustrated in FIG. 12A, in a state where there is enough space in the physical free space of the virtual storage, the expansion ratio is classified into three stages and set for the ratio G of a volume reserved for allocation with respect to an increased amount (the expansion ratio: "1.2", "1.5", or an "actual performance value"). In addition, as illustrated in FIG. 12B, in a standard state, the expansion ratio is classified into two stages and set for the ratio G (the expansion ratio: "1.5" or an "actual performance value"). In addition, as illustrated in FIG. 12C, in a state where it is desirable to issue warning, the reduction ratio is classified into three stages and set for the ratio G (the reduction ratio: "0.3", "0.5", or "0.7").

In addition, in the present embodiment, the previous determination result is reflected in the present determination in the step 118 or the step 122. This is to avoid a rapid increase or decrease in the volume of an area reserved for allocation when an instantaneous disturbance in a behavior such as, for example, the instantaneous variation of the volume of written data has occurred in a virtual disk. For example, when the present determination contradicts the previous determination, it may be desirable that the determination is kept for a given period of time (in the present embodiment, for example, a situation is surveyed once) without changing the volume of an area reserved for allocation (as keep of the status quo). Specifically, it may be a case where the previous determination is the "expansion" and the present determination is the "reduction" or a case where the previous determination is the "reduction" and the present determination is the "expansion". In the present embodiment, when the same determination occurs two times in a row (when a tendency of behavior is the same), reduction or expansion is implemented on the volume of an area reserved for allocation.

In such a way as described above, the update processing for the volume of an area reserved for allocation is periodically executed, and the virtual disk management table 38 is updated.

Next, the operation of the storage control device 20 will be described. The storage control program 58 in the computer 50 is executed, and hence, the storage control device 20 is realized. In other words, the CPU 52 in the computer 50 reads and loads the storage control program 58 from the storage unit 56 into the memory 54 to sequentially execute processes included in the storage control program 58, and hence, executes storage control processing.

Figure 13:
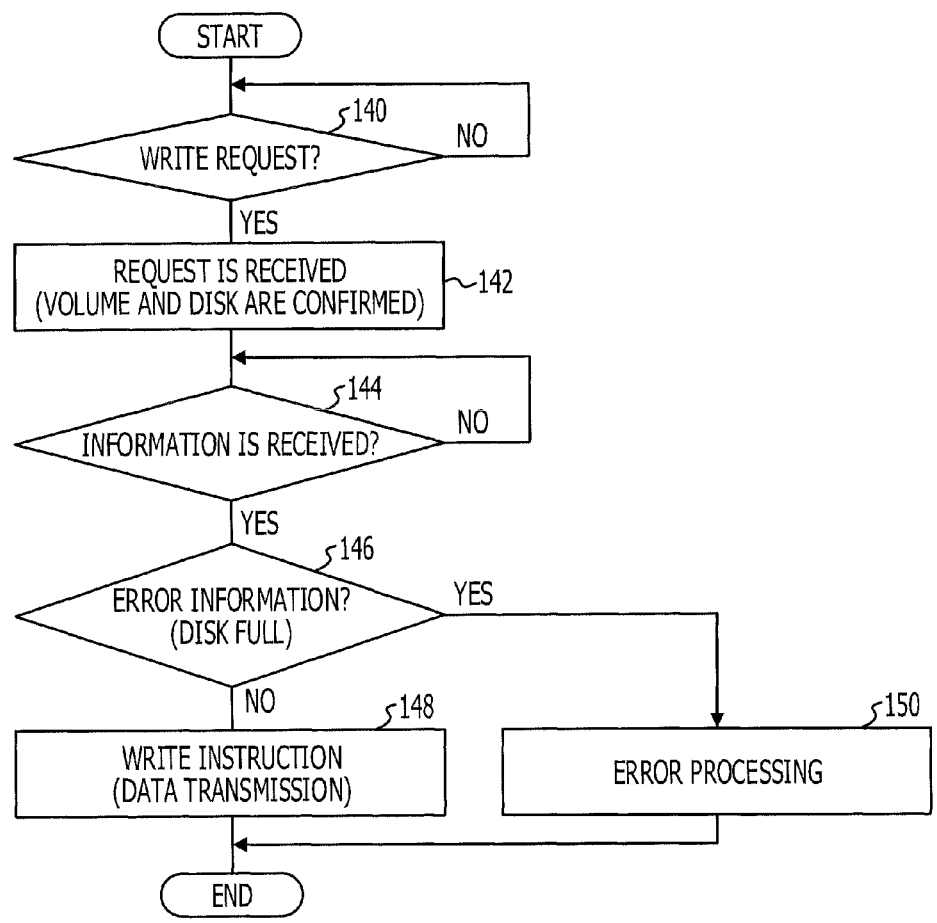
FIG. 13 is a flowchart illustrating a flow of processing of a request reception process.

FIG. 13 is a flowchart illustrating the flow of the request reception process 60 included in the storage control program 58, executed in the computer 50 according to the present embodiment. The request reception process 60 in the storage control program 58 is executed in the computer 50 in the computer system 10, and hence, the computer 50 operates as the reception unit 22 in the storage control device 20, and executes request reception processing. As illustrated in FIG. 13, when the request reception process 60 is executed, the reception unit 22 continues receiving information from the server 12 until receiving, from the server 12, a write request to the storage device 21 (affirmative determination in a step 140).

When having received, from the server 12, a request to write data into the storage device 21, or the like, the reception unit 22 in the storage control device 20 executes the request reception processing (step 142). The request reception processing is processing for confirming, for example, the information of the volume of data, a virtual storage, and a virtual disk of the request to write data, or the like, requested by the server 12. In this step 142, the execution unit 24 is requested to confirm, for example, the information of the volume of data, a virtual storage, and a virtual disk of the request to write data, or the like, requested by the server 12. Next, the reception unit 22 waits until receiving information from the execution unit 24 (affirmative determination in a step 144). At this time, the execution unit 24 executes the processing routine of the execution process 62 described later (refer to FIG. 14), and sends back information to the reception unit 22.

When having received the information from the execution unit 24, the reception unit 22 determines whether or not the received information is error information (step 146), and when the received information is the error information (affirmative determination in the step 146), the reception unit 22 executes error processing (step 150) and terminates the present routine. An example of the error information is information indicating "Disk Full" indicating that the volume of data subjected to the write request from the server 12 is a volume exceeding a remaining volume. In this case, in the error processing in the step 150, information indicating "Disk Full" is sent back to the server 12. On the other hand, when negative determination is performed in the step 146, a write instruction is transmitted to the server 12 (step 148). In other words, the reception unit 22 transmits, to the server 12, information promoting data transmission. Accordingly, the server 12 starts transmitting data to be written into the storage device 21. In addition, in the step 148, processing for transferring, to the execution unit 24, the data transmitted from the server 12 is also performed.

The execution process 62 included in the storage control program 58 in the computer 50 is executed, and execution processing is executed in the storage control device 20.

Figure 14:
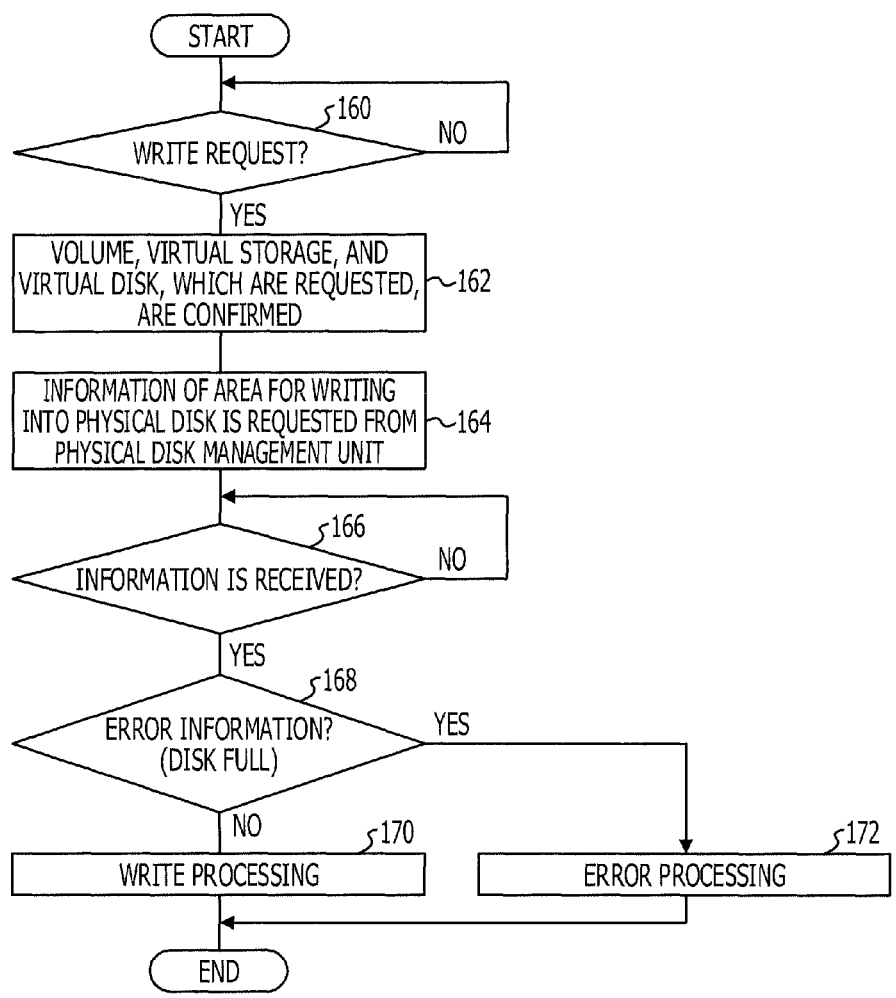
FIG. 14 is a flowchart illustrating a flow of processing of an execution process.

FIG. 14 is a flowchart illustrating the flow of the execution process 62 included in the storage control program 58, executed in the computer 50 according to the present embodiment. The execution process 62 in the storage control program 58 is executed in the computer 50 in the computer system 10, and hence, the computer 50 operates as the execution unit 24 in the storage control device 20 and executes, on the storage unit 14, execution processing such as writing of data. When the execution process 62 has been executed, the execution unit 24 waits until a request to write data is made to the reception unit 22 and the execution unit 24 receives, from the reception unit 22, information indicating the confirmation of reception of a request, as illustrated in FIG. 14 (step 160).

When affirmative determination is performed in the step 160, the execution unit 24 executes confirmation processing relating to the information of the volume of data, a virtual storage, and a virtual disk, requested by the server 12 (step 162). This confirmation processing is processing for acquiring, for example, the information of the volume of data, a virtual storage, and a virtual disk of the request to write data, or the like, requested by the server 12. Next, the execution unit 24 transmits, to the management unit 26 in the physical disk, the information acquired in the step 162, and hence, requests the information of an area for writing into the physical disk (step 164). The execution unit 24 waits until receiving information from the management unit 26 in the physical disk (step 166). At this time, in the management unit 26 in the physical disk, the processing routine of the physical disk management process 70 described later (refer to FIG. 15) is executed, and information is sent back to the execution unit 24.

When having received the information from the management unit 26 in the physical disk (affirmative determination in step 166), the execution unit 24 determines whether or not the information received from the management unit 26 is error information (step 168). When the received information is the error information (affirmative determination in the step 168), the execution unit 24 executes error processing (step 172) and terminates the present routine. An example of the error processing is processing for sending back information indicating "Disk Full". On the other hand, when negative determination is performed in the step 168, the execution unit 24 executes processing for writing data from the server 12 into the storage unit 14 (step 170).

Next, by executing the physical disk management process 70 included in the storage control program 58 in the computer 50, the storage control device 20 executes physical disk management processing.

Figure 15:
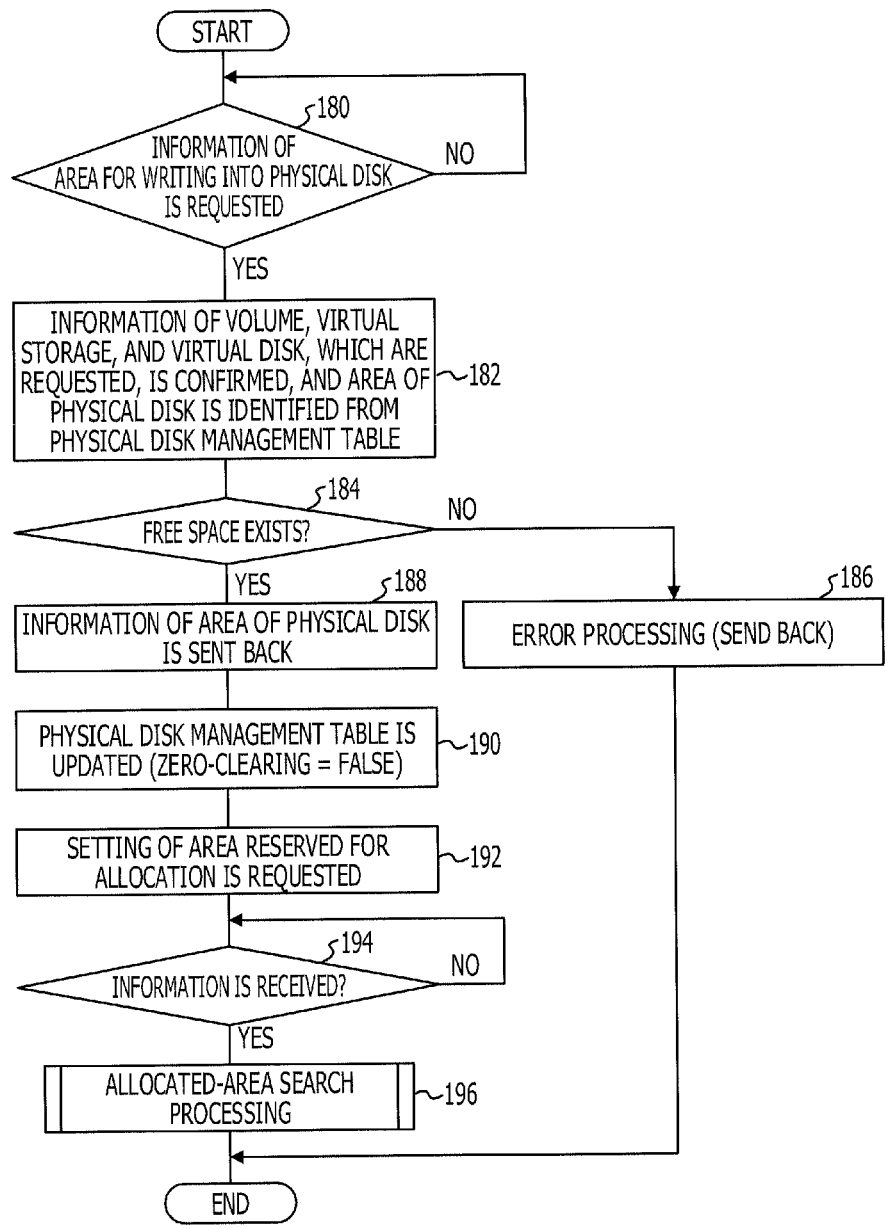
FIG. 15 is a flowchart illustrating a flow of processing of a physical disk management process.

FIG. 15 is a flowchart illustrating the flow of the physical disk management process 70 included in the storage control program 58 executed in the computer 50 according to the present embodiment. The physical disk management process 70 in the storage control program 58 is executed in the computer 50 in the computer system 10, and hence, the computer 50 operates as the management unit 26 in the storage control device 20, and executes the management processing of the storage unit 14. When the physical disk management process 70 has been executed, the management unit 26 waits until receiving, from the execution unit 24, writing area information indicating information relating to an area for writing into the physical disk, as illustrated in FIG. 15 (step 180).

When affirmative determination is performed in the step 180, the management unit 26 acquires the information of the volume of data to be written into the storage unit 14, a virtual storage, and a virtual disk, requested by the execution unit 24. Next, the management unit 26 refers to the physical disk management table 36, and identifies the areas of the physical disks HDD-01 to HDD-n in the storage unit 14, which relate to the data requested to be written into the storage unit 14 (step 182). Here, by detecting a block number set as an area reserved for allocation, the management unit 26 identifies an area within the physical disks HDD-01 to HDD-n.

Next, the management unit 26 determines whether or not the area of a physical disk identified in the step 182 exceeds the volume of the data requested to be written into storage unit 14 (step 184). When negative determination is performed in the step 184, the management unit 26 terminates the present processing routine after having executed error processing for sending back, to the execution unit 24, error information indicating "Disk Full" (step 186).

On the other hand, when affirmative determination is performed in the step 184, the management unit 26 sends back, to the execution unit 24, the information of an area used for writing data into the physical disk (step 188). Specifically, the management unit 26 transmits a block number to the execution unit 24. With respect to the area (block) used for writing data into the physical disk, sent back to the execution unit 24 in the step 188, the management unit 26 updates the information of zero-clearing in the physical disk management table 36 to "FALSE" (step 190). In addition, the management unit 26 requests the control unit 28 to perform setting for updating an area reserved for allocation (step 192). At this time, the control unit 28 executes the processing routine (refer to FIG. 17) of the allocation process 68 included in the area allocation control process 64, described later, and sends back information to the management unit 26.

The management unit 26 waits until receiving information from the control unit 28 (step 194). At this time, the control unit 28 execute the allocation process 68 described later, and sends back the information to the management unit 26. The information sent back by executing the allocation process 68 is information indicating a request to search for successive blocks settable as an area reserved for allocation, with respect to the management unit 26 serving as a physical disk.

When having received the information from the control unit 28 (affirmative determination in the step 194), the management unit 26 terminates the present processing routine after having executed the allocated-area search processing (FIG. 16) (step 196).

Figure 16:
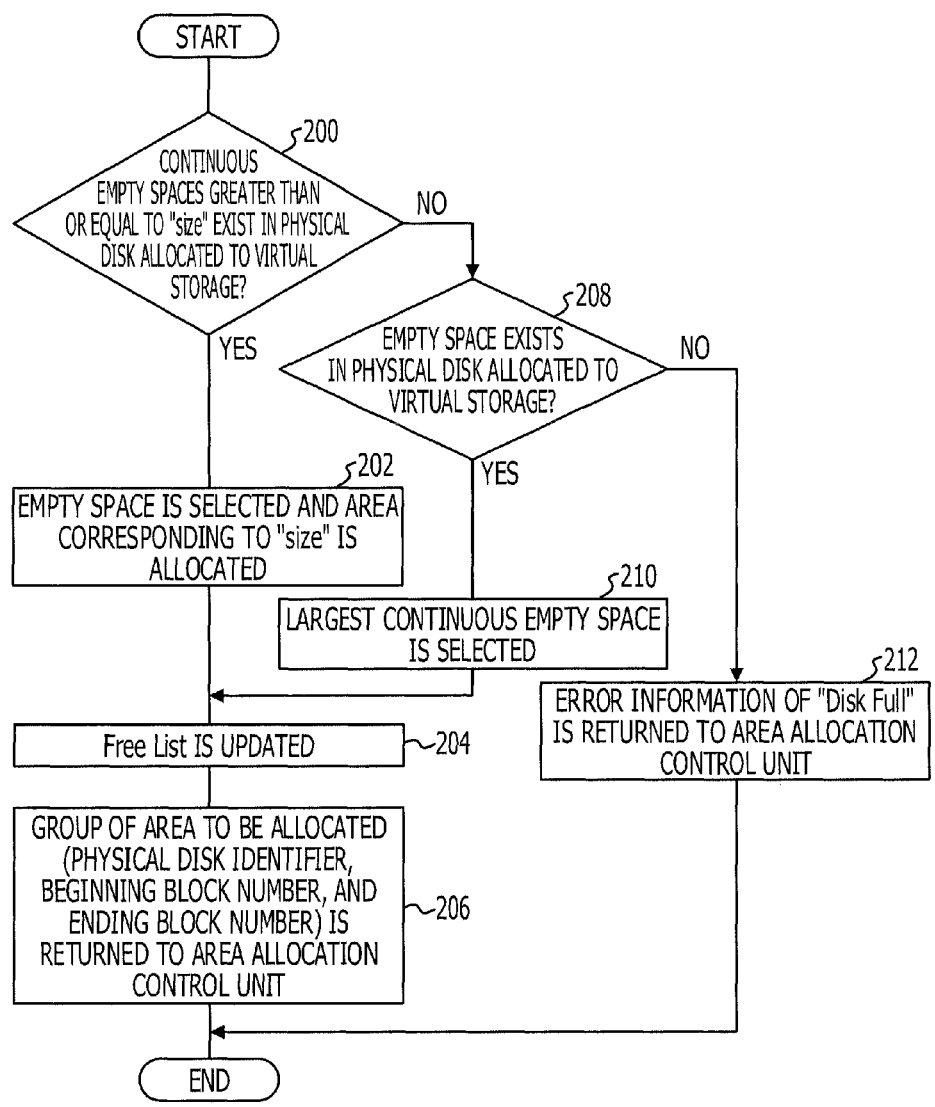
FIG. 16 is a flowchart illustrating a flow of an allocated-area search processing.

FIG. 16 is a flowchart illustrating the flow of allocated-area search processing executed in the management unit 26. The management unit 26 determines whether or not continuous empty spaces greater than or equal to a variable "size" exist in a physical disk allocated to a virtual storage (step 200). This variable "size" is information passed as an argument from the control unit 28 (refer to FIG. 17). In the present embodiment, the free list 37 for facilitating empty space management is used. Accordingly, here, the management unit 26 refers to the free list 37 and confirms an empty space. In addition, when the free list 37 is not used, the management unit 26 identifies the identifier of an allocated physical disk, with reference to the virtual disk management table 38 and the virtual storage table 39. Next, the management unit 26 refers to the physical disk management table 36, and extracts an area where the zero-clearing is "TRUE" and a virtual disk of an allocation destination is "-", with respect to the corresponding physical disk.

The management unit 26 selects an empty space in the physical disk, and allocates an area corresponding to the variable "size" (step 202). Here, in a case where a plurality of continuous empty spaces to be candidates exist when an empty space in the physical disk is selected, it may be desirable that the management unit 26 selects an adequate empty space using a technique of the related art. For example, a technique based on a first hit method has been known where an empty space that satisfies the number of blocks of the variable "size" and has been found first is selected. In addition, as another example, a technique based on a best hit method has been known where an empty space nearest to the number of blocks of the variable "size" is selected. Furthermore, as another example, a technique based on a maximum method has been known where the largest empty space is selected. In addition, it is assumed that, in the step 202, blocks corresponding to the value of the variable "size" are allocated starting from the beginning block of a selected empty space.

The management unit 26 updates the free list 37 (step 204). In other words, the management unit 26 removes the block allocated in the step 202, from the free list 37. In addition, the management unit 26 passes the information of the area allocated in the step 202, to the control unit 28 (step 206), and terminates the present processing routine. This information passed to the control unit 28 is group information including the identifier of a physical disk, the number of a beginning block, and the number of an ending block.

On the other hand, when negative determination is performed in the step 200, the management unit 26 determines whether or not an empty space exists in the physical disk allocated to the virtual storage (step 208). When affirmative determination is performed in the step 208, the management unit 26 selects the largest continuous empty space among empty spaces in the physical disk allocated to the virtual storage (step 210). On the other hand, when negative determination is performed in the step 208, since no empty space exists or an empty space is minimal, the management unit 26 passes, to the control unit 28, error information indicating "Disk Full" (step 212).

Next, the storage control device 20 executes the allocation process 68 in the area allocation control process 64 included in the storage control program 58 in the computer 50, and hence, executes area allocation processing.

Figure 17:
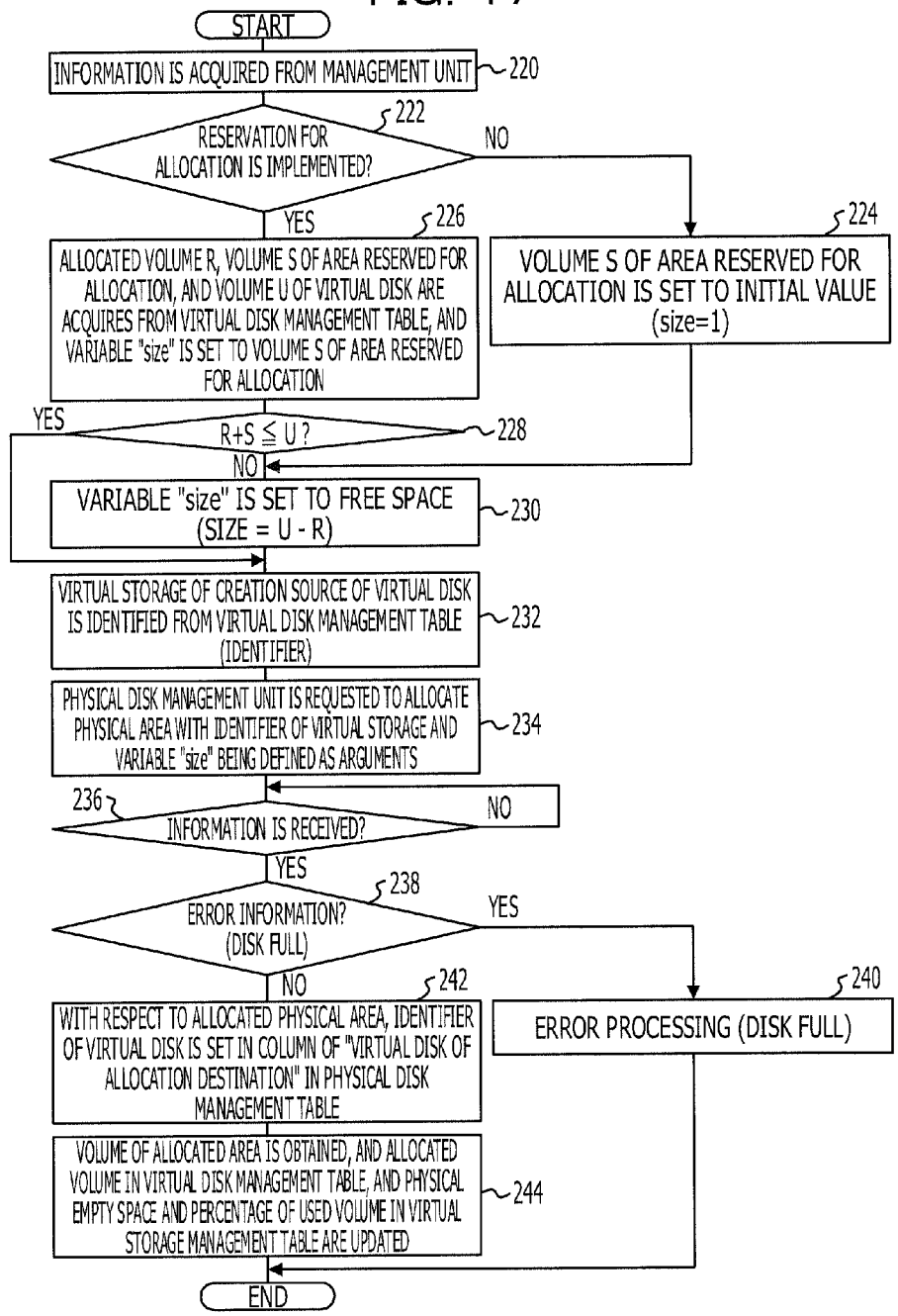
FIG. 17 is a flowchart illustrating a flow of processing of an allocation process.

FIG. 17 is a flowchart illustrating the flow of the allocation process 68 in the area allocation control process 64 included in the storage control program 58, executed in the computer 50. The allocation process 68 in the area allocation control process 64 in the storage control program 58 is executed in the computer 50 in the computer system 10, and hence, the computer 50 operates as the allocation unit 32 in the control unit 28 in the storage control device 20. When the allocation process 68 in the area allocation control process 64 has been executed, the allocation unit 32 in the control unit 28 acquires, from the management unit 26, information relating to setting of an area reserved for allocation, as illustrated in FIG. 17 (step 220). As an example of the information relating to the setting of an area reserved for allocation, there is the identifier of a virtual disk requested to perform reservation for allocation.

Next, the allocation unit 32 determines whether or not to execute processing for reservation for allocation (step 222). First, the allocation unit 32 refers to the virtual disk management table 38, and identifies the virtual storage of the creation source of the virtual disk requested to perform reservation for allocation. Next, the allocation unit 32 refers to the virtual storage management table 39, acquires the percentage of the used volume of the virtual storage of the creation source, and identifies which one of states in the volume-of-area-reserved-for-allocation change reference table 40 the virtual storage of the creation source is in. In other words, in the state D, the allocation unit 32 determines that the reservation for allocation is not implemented. Accordingly, when negative determination is performed in the step 222, the allocation unit 32 sets the volume S of an area reserved for allocation to an initial value (step 224). As an example of the initial value set in the step 224 is 1 block, and it may be possible to set the variable "size" to "1".

On the other hand, when affirmative determination is performed in the step 222, the allocation unit 32 acquires an allocated volume R, the volume S of an area reserved for allocation, and the volume U of a virtual disk, from the virtual disk management table 38 (step 226). In addition, the variable "size" is set to the volume S of an area reserved for allocation. In addition, the allocation unit 32 determines whether or not R+S≤U is satisfied (step 228). When negative determination is performed in the step 228, the allocation unit 32 sets the variable "size" to the free space of the virtual disk (size=U−R) (step 230). In other words, the allocation unit 32 sets the variable "size" to a volume obtained by subtracting the volume R of an allocated area from the volume U of the virtual disk, in the step 230. In addition, when affirmative determination is performed in the step 228, the present processing proceeds to a step 232 without change.

The allocation unit 32 identifies the virtual storage of the creation source of the virtual disk, from the virtual disk management table 38, and extracts the identifier of the virtual storage (step 232). Next, the allocation unit 32 requests the management unit 26 in the physical disk to allocate a physical area, with the identifier of the virtual storage, identified in the step 232, and the value of the variable "size", set as described above, being defined as arguments (step 234).

Next, the allocation unit 32 waits until receiving information from the management unit 26 in the physical disk (step 236). At this time, the management unit 26 in the physical disk executes the above-mentioned allocated-area search processing (refer to FIG. 16), and sends back the information of an execution result. Next, the allocation unit 32 in the control unit 28 determines whether or not the information received from the management unit 26 is error information (step 238). When affirmative determination is performed in the step 238, the allocation unit 32 executes error processing (step 240) and terminates the present routine. On the other hand, when negative determination is performed in the step 238, the present processing proceeds to a step 242.

With respect to the allocated physical area, the allocation unit 32 sets the identifier of the virtual disk as the information of the virtual disk of an allocation destination in the physical disk management table 36 (step 242). Next, the allocation unit 32 obtains an allocated volume, updates an allocated volume in the virtual disk management table 38, and a physical empty space and the percentage of a used volume in the virtual storage management table 39 (step 244), and terminates the present processing routine.

FIG. 18 to FIG. 20 illustrate specific examples when an area reserved for allocation is allocated to the storage unit 14 owing to the storage control device 20 described above. In addition, here, it is assumed that the increased amount of an actually used amount is obtained by subtracting an actually used amount previously checked from a current actually-used amount. In addition, it is assumed that the volume of 1 block is 512 KB. Furthermore, it is assumed that the "physical free space" of the virtual storage vstorage-01 is in a state of 50% (standard).

In the example of FIG. 18, as for the virtual disk disk-01, an increased amount of 3,219 KB obtained by subtracting a used amount previously checked from a current actually-used amount accounts for 78.6% of 8 blocks (=4,096 KB) serving as the volume of an area reserved for allocation. Accordingly, the volume of an area reserved for allocation is determined as keep of the status quo. As for the virtual disk disk-02, an increased amount of 7,936 KB accounts for 155% of 10 blocks (=5,120 KB) serving as the volume of an area reserved for allocation. Accordingly, the volume of an area reserved for allocation is expanded to 16 blocks (the fraction of 7936/512 is rounded up). As for the virtual disk disk-03, an increased amount of 370 KB accounts for 723% of 1 block (=512 KB) serving as the volume of an area reserved for allocation. Accordingly, the volume of an area reserved for allocation is determined as keep of the status quo.

In the example of FIG. 19, as for the virtual disk disk-01, an increased amount of 1,716 KB accounts for 41.9% of 8 blocks (=4,096 KB) serving as the volume of an area reserved for allocation. Accordingly, on the basis of the reduction ratio table 42, the volume of an area reserved for allocation is reduced to 4 blocks. As for the virtual disk disk-02, an increased amount of 4,638 KB accounts for 56.6% of 16 blocks (=8,192 KB) serving as the volume of an area reserved for allocation. Accordingly, the volume of an area reserved for allocation is determined as keep of the status quo. As for the virtual disk disk-03, an increased amount of 128 KB accounts for 25.0% of 1 block (=512 KB) serving as the volume of an area reserved for allocation. Accordingly, since being 1 block (minimum value), the volume of an area reserved for allocation is determined as keep of the status quo.

In the example of FIG. 20, as for the virtual disk disk-01, an increased amount of 5,120 KB accounts for 250.0% of 4 blocks (=2,048 KB) serving as the volume of an area reserved for allocation. While determination falls within the range of "expansion", since the determination has a tendency opposite to the previous determination (reduction), the volume of an area reserved for allocation is determined as keep of the status quo. As for the virtual disk disk-02, an increased amount of 3,854 KB accounts for 47.0% of 16 blocks (=8,192 KB) serving as the volume of an area reserved for allocation. Accordingly, on the basis of the reduction ratio table 42, the volume of an area reserved for allocation is reduced to 8 blocks. As for the virtual disk disk-03, an increased amount of 740 KB accounts for 144.5% of 1 block (=512 KB) serving as the volume of an area reserved for allocation. Accordingly, the volume of an area reserved for allocation is expanded to 2 blocks (the fraction of 1×1.5=1.5 is rounded up).

As described above, in the present embodiment, by putting a thin provisioning method, in which it may be possible to effectively use a physical disk, into practical use, the deterioration of I/O performance is suppressed that is due to an area allocated to a virtual disk being dispersed on the physical disk. In other words, in the present embodiment, when an additional area is allocated on a physical disk, a plurality of blocks are successively allocated instead of a unit of one block, taking into consideration a write data amount. Accordingly, the deterioration of I/O performance is reduced. In addition, the amount of data to be written is not confirmed until being actually written, and also changes from moment to moment. Therefore, in the present embodiment, a volume where the additional area is allocated is predicted on the basis of a past actual performance value, and a plurality of blocks are successively allocated. Therefore, an actual performance value is periodically confirmed, and the number of blocks serving as the volume of an area reserved for allocation is adjusted.

In detail, in the present embodiment, a determination criterion is adjusted in response to a physical free space. In other words, in the present embodiment, in response to the physical free space, the range of the increased amount of the actually used amount of a virtual disk, used for determining the number of blocks serving as the volume of an area reserved for allocation as one of reduction, keep, and expansion, and a reduction ratio or an expansion ratio are automatically adjusted. In addition, in the present embodiment, when the actual performance value is periodically confirmed and the volume of an area reserved for allocation is predicted, the rapid fluctuation of the number of blocks serving as the volume of an area reserved for allocation is suppressed by taking into consideration the history of the actual performance value.

Accordingly, in the present embodiment, when the free space of the virtual storage is large, the allocation of an area reserved for allocation is actively implemented, and when the free space thereof is small, the allocation of an area reserved for allocation is suppressed.

In addition, in the above description, as an example, the computer system 10 has been explained where a server is cited as an example of a device making a request to write data into the storage device 21. However, the disclosed technology is not limited to these configurations, and it is to be understood that various improvements and modifications may occur insofar as they are within the above-mentioned scope.

In addition, while, in the above description, the embodiment has been explained where the program is preliminarily stored (installed) in the storage unit in the computer, the processing program may also be provided in a form of being recorded in a recording medium such as a CD-ROM or a DVD-ROM.

All the documents, the patent applications, and technical standards described in the present specification are incorporated into the present specification by reference at the same level as a case where it is specifically and individually described that individual documents, patent applications, and technical standards are incorporated by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device comprising:
a memory configured to store a program; and
a processor coupled to the memory and configured to execute a process based on the program, the process including:
writing additional data into an area reserved for allocation in a physical disk including a recording area into which data is written, the area reserved for allocation being allocated so as to write thereinto the additional data,
detecting a volume of the data and the additional data written into the physical disk as a used amount of the physical disk, calculating an amount of increase or decrease in a current used amount of the physical disk with respect to the used amount of the physical disk previously detected by the detecting, calculating a changed volume, used for changing a volume of the area reserved for allocation, on the basis of a ratio between the amount of increase or decrease in the used amount of the physical disk and a volume of the area reserved for allocation, and allocating the area reserved for allocation to the physical disk so that the area reserved for allocation corresponding to the calculated changed volume is continued in the physical disk.

2. The storage control device according to claim 1, the process further including:

determining a tendency of increase or decrease in the used amount of the physical disk on the basis of the ratio, wherein the calculating of the changed volume of the area reserved for allocation calculates the changed volume of the area reserved for allocation corresponding to the used amount of the physical disk on the basis of the tendency of increase or decrease in the used amount of the physical disk.

3. The storage control device according to claim 1, further comprising:

a storage configured to store therein a table in which information indicating the previous used amount of the physical disk, information indicating the current used amount of the physical disk, and information indicating the volume of an area reserved for allocation are registered with being associated with one another, wherein the process further includes:

updating the table with the information indicating the current used amount of the physical disk, stored in the table, being defined as the information indicating the previous used amount of the physical disk, updating the table with information indicating a volume of the recording area, allocated to the detected physical disk, being defined as the information indicating the current used amount of the physical disk, and on the basis of the ratio, updating information indicating the changed volume of the area reserved for allocation corresponding to the information indicating the used amount of the physical disk, as the information in the table, which indicates the volume of the area reserved for allocation, wherein the allocating allocates the area reserved for allocation to the physical disk so that the area reserved for allocation corresponding to a volume registered in the table stored in the storage is continued in the physical disk.

4. The storage control device according to claim 3, wherein the storage stores therein the table in which the information indicating the previous used amount of the physical disk, the information indicating the current used amount of the physical disk, the information indicating the volume of an area reserved for allocation, and information of a determination value indicating a tendency of increase or decrease in the used amount of the physical disk in the table are registered with being associated with one another, and the calculating of the changed volume of the area reserved for allocation updates the table with information being defined as information of the determination value, on the basis of the ratio, the former information indicating a verification result obtained by determining the tendency of increase or decrease in the used amount of the physical disk, and calculates the changed volume of the area reserved for allocation corresponding to the used amount of the physical disk, on the basis of the information of the determination value in the table stored in the storage.

5. The storage control device according to claim 4, wherein the storage includes a reference table in which a criterion value of the ratio, used for determining the tendency of increase or decrease in the used amount of the physical disk with pieces of information indicating keep, expansion, and reduction being defined as determination values, is registered with being associated with a used amount ratio of the used amount of the physical disk to a volume of the whole physical disk with respect to each determination value, and the calculating of the changed volume of the area reserved for allocation obtains the used amount ratio of the used amount of the physical disk to the volume of the whole physical disk, and calculates the changed volume of the area reserved for allocation corresponding to the used amount of the physical disk on the basis of information of the determination values in the table stored in the storage and the criterion value corresponding to the used amount ratio in the reference table.

6. The storage control device according to claim 5, wherein the storage includes a scaling table in which information indicating an expansion ratio or a reduction ratio is registered with being associated with the tendency of increase or decrease in the used amount of the physical disk corresponding to the criterion value of the ratio, and the calculating of the changed volume of the area reserved for allocation calculates the changed volume of the area reserved for allocation corresponding to the used amount of the physical disk, on the basis of the scaling table stored in the storage.

7. The storage control device according to claim 1, wherein a virtual storage including a virtual logical disk is caused to correspond to a physical storage including a physical disk, wherein the process further includes:

causing the calculating of the changed volume of the area reserved for allocation and the allocating to be executed when the virtual logical disk is requested to write thereinto the data.

8. A storage control method comprising:

writing additional data into an area reserved for allocation in a physical disk including a recording area into which data is written, the area reserved for allocation being allocated so as to write thereinto the additional data, detecting a volume of the data and the additional data written into the physical disk as a used amount of the physical disk;

calculating an amount of increase or decrease in a current used amount of the physical disk with respect to a previous used amount of the physical disk;

calculating a changed volume, used for changing a volume of the area reserved for allocation, on the basis of a ratio between the amount of increase or decrease in the used amount of the physical disk and a volume of the area reserved for allocation, and allocating the area reserved for allocation to the physical disk so that the area reserved for allocation corresponding to the calculated changed volume is continued in the physical disk.

9. The storage control method according to claim 8, further comprising:

determining a tendency of increase or decrease in the used amount of the physical disk on the basis of the ratio, wherein the calculating of the changed volume of the area reserved for allocation calculates the changed volume of the area reserved for allocation corresponding to the used amount of the physical disk on the basis of the previously determined tendency of increase or decrease in the used amount of the physical disk.

10. The storage control method according to claim 8, wherein a table in which information indicating the previous used amount of the physical disk, information indicating the current used amount of the physical disk, and information indicating the volume of an area reserved for allocation are registered with being associated with one another is stored in a storage, wherein the method further comprises:

updating the table with the information indicating the current used amount of the physical disk, stored in the table, being defined as the information indicating the previous used amount of the physical disk, updating the table with information indicating a volume of the recording area, allocated to the detected physical disk, being defined as the information indicating the current used amount of the physical disk, and on the basis of the ratio, updating information indicating the changed volume of the area reserved for allocation corresponding to the information indicating the used amount of the physical disk, as the information in the table, which indicates the volume of the area reserved for allocation, wherein the allocating allocates the area reserved for allocation to the physical disk so that the area reserved for allocation corresponding to a volume registered in the table stored in the storage is continued in the physical disk.

11. The storage control method according to claim 10, wherein the table in which the information indicating the previous used amount of the physical disk, the information indicating the current used amount of the physical disk, the information indicating the volume of an area reserved for allocation, and information of a determination value indicating a tendency of increase or decrease in the used amount of the physical disk in the table are registered with being associated with one another is stored in the storage; and the calculating of the changed volume of the area reserved for allocation updates the table with information being defined as information of the determination value, on the basis of the ratio, the former information indicating a verification result obtained by determining the tendency of increase or decrease in the used amount of the physical disk, and calculates the changed volume of the area reserved for allocation corresponding to the used amount of the physical disk, on the basis of the information of the determination value in the table stored in the storage.

12. The storage control method according to claim 11, wherein;

a reference table in which a criterion value of the ratio, used for determining the tendency of increase or decrease in the used amount of the physical disk with pieces of information indicating keep, expansion, and reduction being defined as determination values, is registered with being associated with a used amount ratio of the used amount of the physical disk to a volume of the whole physical disk with respect to each determination value is included in the storage; and the calculating of the changed volume of the area reserved for allocation obtains the used amount ratio of the used amount of the physical disk to the volume of the whole physical disk, and calculates the changed volume of the area reserved for allocation corresponding to the used amount of the physical disk on the basis of information of the determination values in the table stored in the storage and the criterion value corresponding to the used amount ratio in the reference table.

13. The storage control method according to claim 12, wherein a scaling table in which information indicating an expansion ratio or a reduction ratio is registered with being associated with the tendency of increase or decrease in the used amount of the physical disk corresponding to the criterion value of the ratio is included in the storage; and the calculating of the changed volume of the area reserved for allocation calculates the changed volume of the area reserved for allocation corresponding to the used amount of the physical disk, on the basis of the scaling table stored in the storage.

14. The storage control method according to claim 8, wherein a virtual storage including a virtual logical disk is caused to correspond to a physical storage including a physical disk, and wherein the method further includes causing the calculating of the changed volume of the area reserved for allocation and the allocating to be executed when the virtual logical disk is requested to write thereto the data.

15. A computer-readable recording medium storing a program for causing an apparatus to execute a process, the process comprising:

writing additional data into an area reserved for allocation in a physical disk including a recording area into which data is written, the area reserved for allocation being allocated so as to write thereto the additional data, detecting a volume of the data and the additional data written into the physical disk as a used amount of the physical disk;

calculating an amount of increase or decrease in a current used amount of the physical disk with respect to a previous used amount of the physical disk;

calculating a changed volume, used for changing a volume of the area reserved for allocation, on the basis of a ratio between the amount of increase or decrease in the used amount of the physical disk and a volume of the area reserved for allocation, and allocating the area reserved for allocation to the physical disk so that the area reserved for allocation corresponding to the calculated changed volume is continued in the physical disk.

* * * * *